(12) United States Patent
Sugama et al.

(10) Patent No.: US 11,994,827 B2
(45) Date of Patent: May 28, 2024

(54) PHOTORESPONSIVE POLYMER

(71) Applicant: Konica Minolta, Inc., Tokyo (JP)

(72) Inventors: Kouji Sugama, Musashino (JP);
Yukiko Nakai, Toyohashi (JP);
Kazuaki Nakamura, Hino (JP);
Toyoko Shibata, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 83 days.

(21) Appl. No.: 17/658,563

(22) Filed: Apr. 8, 2022

(65) Prior Publication Data

US 2022/0373913 A1    Nov. 24, 2022

(30) Foreign Application Priority Data

Apr. 30, 2021 (JP) ................. 2021-078064

(51) Int. Cl.
*G03G 9/087* (2006.01)
*C08F 26/06* (2006.01)
*C08F 293/00* (2006.01)
*G03G 15/04* (2006.01)

(52) U.S. Cl.
CPC ......... *G03G 9/08788* (2013.01); *C08F 26/06* (2013.01); *C08F 293/005* (2013.01); *G03G 9/0874* (2013.01); *G03G 15/04* (2013.01)

(58) Field of Classification Search
None
See application file for complete search history.

(56) References Cited

FOREIGN PATENT DOCUMENTS

| JP | 2011-256155 A | 12/2011 | |
|----|---------------|---------|---|
| JP | 2020180177 A * | 11/2020 | ............ C08F 120/38 |
| WO | 2013/081155 A1 | 6/2013 | |

OTHER PUBLICATIONS

Claramunt et al., Synthesis and Mesogenic Properties of Schiff Bases Derived from Aminopyrazoles, 1999, Heterocycles, vol. 51, No. 4, 751-762.*

* cited by examiner

*Primary Examiner* — Eli D. Strah
(74) *Attorney, Agent, or Firm* — LUCAS & MERCANTI, LLP

(57) ABSTRACT

A photoresponsive polymer includes a structural unit represented by the following general formula (1), the photoresponsive polymer being fluidized by light irradiation, and reversibly non-fluidized:

[Chemical formula 1]

$$R_1\text{—}Z_1\text{=}Z_2\text{—}R_2 \qquad \text{General formula (1)}$$

in the formula, $Z_1$ and $Z_2$ each represent CH or N, and $Z_1 \neq Z_2$, $R_1$ represents an aromatic hydrocarbon group having a substituent $R_a$ selected from the group consisting of an alkyl group, an alkoxy group, and a halogen atom at each of two ortho positions with respect to $Z_1$, $R_2$ represents an aromatic heterocyclic group with or without a substituent, and at least one of the $R_1$ and the $R_2$ is bonded to a group containing a structure derived from a polymerizable group.

22 Claims, 3 Drawing Sheets

PHOTORESPONSIVE POLYMER

The entire disclosure of Japanese patent Application No. 2021-078064, filed on Apr. 30, 2021, is incorporated herein by reference in its entirety.

BACKGROUND

Technological Field

The present invention relates to a photoresponsive polymer that is fluidized by light irradiation and reversibly non-fluidized.

Description of the Related Art

A photoresponsive material is known as a material that changes fluidity thereof by light irradiation. For example, an azobenzene compound (azobenzene derivative) described in JP 2011-256155 A or WO 2013/081155 A undergoes a phase change due to an isomerization reaction by light irradiation.

It is considered that a change in molecular structure due to the isomerization reaction induces a phase transition from a solid state to a fluid state. In addition, by irradiating the material with light again by changing the wavelength, heating the material, or leaving the material in a dark place at room temperature, a reverse reaction occurs, and the material is solidified again.

However, it has been found that the azobenzene derivative described in JP 2011-256155 A or WO 2013/081155 A has a relatively low molecular weight, therefore has low toughness as a material, and does not achieve sufficient fixability. In addition, it has been found that each of the azobenzene derivatives described in JP 2011-256155 A and WO 2013/081155 A is colored in yellow to orange, and cannot reproduce a desired color when the azobenzene derivatives are applied to an industrial product such as a toner or an adhesive.

SUMMARY

Therefore, an object of the present invention is to provide a photoresponsive polymer that sufficiently secures photoresponsiveness to be fluidized by light irradiation and reversibly non-fluidized, improves fixability when used in a toner, has excellent image stability, and has excellent color reproducibility.

To achieve the abovementioned object, according to an aspect of the present invention, a photoresponsive polymer reflecting one aspect of the present invention comprises a structural unit represented by the following general formula (1), the photoresponsive polymer being fluidized by light irradiation, and reversibly non-fluidized:

[Chemical formula 1]

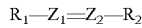        General formula (1)

in the formula, $Z_1$ and $Z_2$ each represent CH or N, and $Z_1 \neq Z_2$, $R_1$ represents an aromatic hydrocarbon group having a substituent $R_a$ selected from the group consisting of an alkyl group, an alkoxy group, and a halogen atom at each of two ortho positions with respect to $Z_1$, $R_2$ represents an aromatic heterocyclic group with or without a substituent, and at least one of the $R_1$ and the $R_2$ is bonded to a group containing a structure derived from a polymerizable group.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
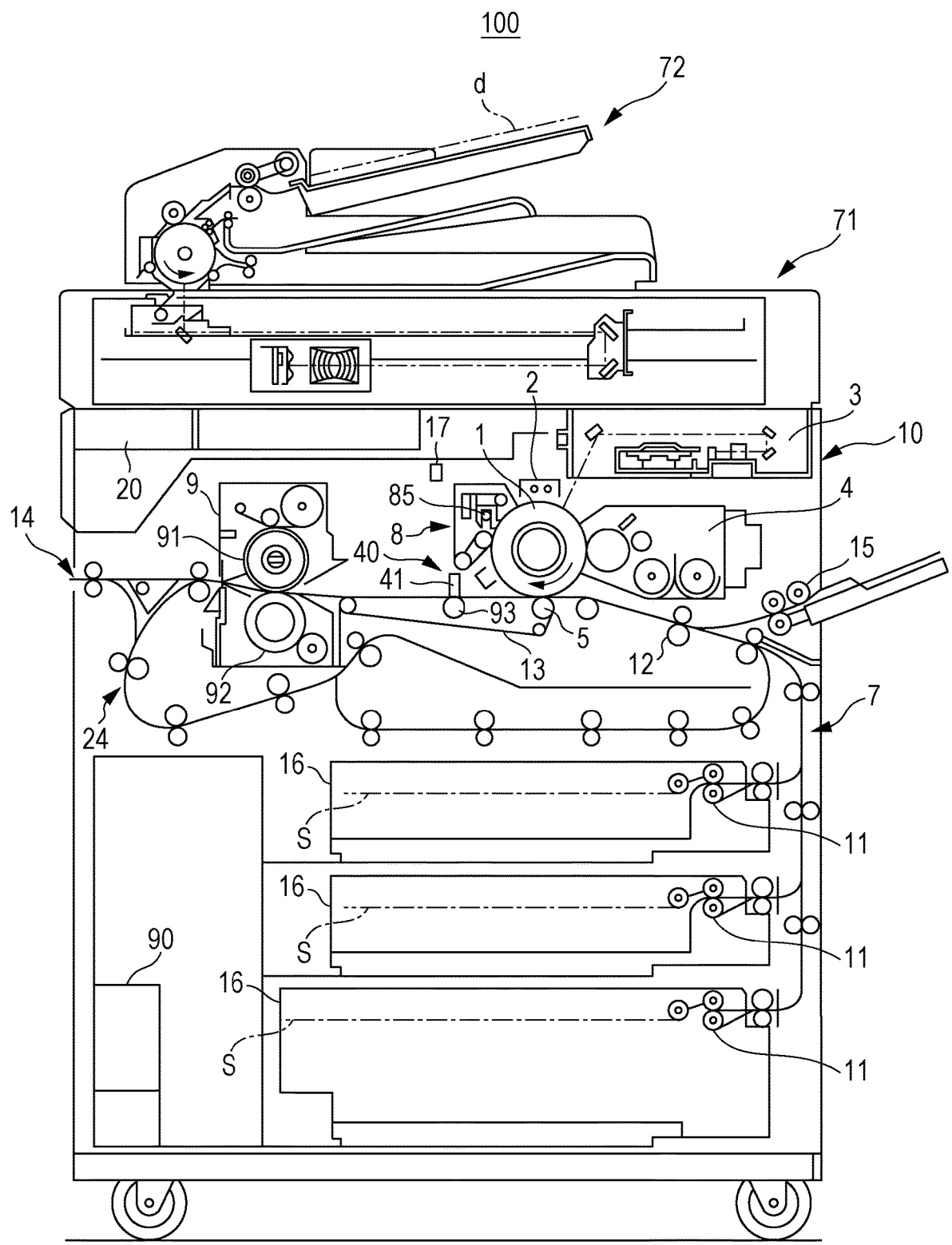
FIG. 1 is a schematic configuration diagram illustrating an image forming apparatus used in an image forming method according to an embodiment of the present invention.

Hereinafter, one or more embodiments of the present invention will be described with reference to the drawings. However, the scope of the invention is not limited to the disclosed embodiments. Note that here, "X to Y" indicating a range means "X or more and Y or less". Here, unless otherwise specified, operation and measurement of physical properties and the like are performed under conditions of room temperature (20 to 25° C.)/relative humidity 40 to 50% RH.

<Photoresponsive Polymer>

An embodiment of the present invention is a photoresponsive polymer containing a structural unit represented by the following general formula (1), fluidized by light irradiation, and reversibly non-fluidized.

[Chemical formula 2]

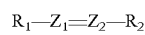        General formula (1)

In the formula $Z_1$ and $Z_2$ each represent CH or N, and $Z_1 \neq Z_2$, $R_1$ represents an aromatic hydrocarbon group having a substituent $R_a$ selected from the group consisting of an alkyl group, an alkoxy group, and a halogen atom at each of two ortho positions with respect to $Z_1$, $R_2$ represents an aromatic heterocyclic group with or without a substituent, and at least one of the $R_1$ and the $R_2$ is bonded to a group containing a structure derived from a polymerizable group.

Here, the general formula (1) is described using one of the following specific examples. As in the following formula, an aromatic hydrocarbon group $R_1$ such as a phenyl group is bonded to $Z_1$ (CH in the following formula), and an aromatic heterocyclic group $R_2$ which may have a substituent is bonded to $Z_2$ (N in the following formula). In the present embodiment, the aromatic hydrocarbon group $R_1$ has a specific substituent $R_a$ (a $CH_3$ group in the following formula) on each of two carbon atoms at ortho positions with respect to $Z_1$. As indicated by a dotted line on $R_1$, $R_1$ has at least one site to be bonded to a group containing a structure derived from a polymerizable group (not illustrated).

[Chemical formula 3]

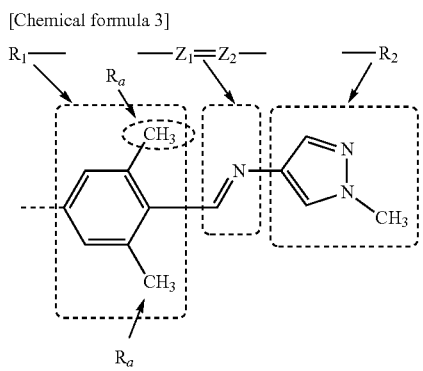

Note that here, the "photoresponsive polymer" may also be simply referred to as a "polymer". It is possible to provide a photoresponsive polymer that sufficiently secures photoresponsiveness to be fluidized by light irradiation and reversibly non-fluidized, improves fixability when used in a toner, has excellent image stability, and has excellent color reproducibility because the photoresponsive polymer contains a structural unit derived from such an azomethine derivative.

Here, "a substance is fluidized by light irradiation and reversibly non-fluidized" means that a substance changes from a non-fluid state to a fluid state by light irradiation and further returns to the non-fluid state. That is, the polymer according to an embodiment of the present invention is in a non-fluid solid state at normal temperature under normal pressure without light irradiation, and is softened by light irradiation to change to a fluid state. By stopping light irradiation and leaving the polymer in a dark place at room temperature or under visible light irradiation, or heating the polymer, the polymer returns to the non-fluid solid state. Here, the fluid state means a state in which a substance is deformed with a small external force.

A mechanism of exhibiting such a technical effect is presumed as follows. However, the technical scope of the present invention is not limited to such a mechanism. That is, an azobenzene compound having a long alkyl chain at a terminal, which is a conventional example, is a material that absorbs light and is softened (optical phase transition) from a solid state, and the optical phase transition is considered to be caused by collapse of a crystal structure due to cis-trans isomerization. The azobenzene compound described in JP 2011-256155 A and WO 2013/081155 A undergoes a phase change due to an isomerization reaction by light irradiation, but the present inventors have found that such an azobenzene compound has low toughness as a material disadvantageously. In addition, it has been found that the azobenzene compound is disadvantageous in that it is difficult to reproduce a desired color when applied to an industrial product because the azobenzene compound exhibits strong absorption derived from n-π* transition in a visible light region and is colored in orange.

In the present invention, a polymer containing a structural unit derived from an azomethine derivative is used. As a result, it has been achieved to provide a polymer that is fluidized by light irradiation, reversibly non-fluidized, has high toughness, and is not significantly colored. Here, it is considered that the polymer containing a structural unit derived from an azomethine derivative induces a reversible fluidization/non-fluidization phenomenon because the azomethine derivative absorbs light, and thermal energy released in a photoexcitation/deactivation process is transmitted (photothermal conversion) to repeating units (structural units) bonded. In particular, when the polymer is a trans form, in addition to the above-described photothermal conversion, trans-cis photoisomerization easily occurs by light irradiation, and a cis form having a low Tg is easily generated. It is considered that when a non-fluid trans form (E) is irradiated with light and isomerized to a cis form (Z), many trans forms (E) change to the cis forms (Z), a regular structure thereby collapses, and a phase transition change, that is, a fluidization phenomenon can be induced. In addition, it is considered that the cis form (Z) returns to the trans form (E), a regular structure is thereby formed again, and a non-fluidization phenomenon can be induced. As a result, it is considered that a more efficient fluidization/non-fluidization phenomenon can be induced. Therefore, in order to induce the fluidization phenomenon, it is considered that many trans forms (E) are preferably isomerized to cis forms (Z). However, in general, an azomethine derivative may have a higher cis-trans isomerization rate than an azobenzene derivative, and it was expected that an azomethine derivative in which a benzene ring without a substituent is bonded to each end of a C=N bond would be disadvantageous for inducing fluidization.

Therefore, in the present invention, in a polymer containing an azomethine derivative, by having an aromatic hydrocarbon group and an aromatic heterocyclic group at both ends of a C=N portion, respectively, and introducing a substituent $R_a$ selected from the group consisting of an alkyl group, an alkoxy group, and a halogen atom at each of two ortho positions of the aromatic hydrocarbon group, fluidization due to a photoisomerization reaction could be efficiently induced. This is considered to be due to the fact that by having the specific substituents $R_a$ at the two ortho positions of the aromatic hydrocarbon group, the cis form was further stabilized and a larger amount of the cis form was generated than a case where the aromatic hydrocarbon group does not have the specific substituent or a case of where the aromatic hydrocarbon group has the specific substituent $R_a$ only at one of the ortho positions.

By introducing the polymer according to an embodiment of the present invention into a toner as a binder resin, it is possible to obtain a toner that can be fixed by light irradiation, has excellent fixability, has excellent image storability, and has high color reproducibility. By introducing the specific substituents $R_a$ into the two ortho positions of the aromatic hydrocarbon group, a cis→trans reaction rate is reduced, the cis form is further stabilized, and a larger amount of the cis form can be generated. As a result, fluidization is induced and melting advances, and it is considered that fixability and image storability are thereby improved. Furthermore, it is presumed that an effect of increasing entanglement between polymer chains is also exhibited by introducing a substituent into the ortho position, and image stability is improved.

In an embodiment of the present invention, the photoresponsive polymer contains the azomethine derivative-derived structural unit having a polymerizable group and represented by the general formula (1). That is, at least one of the $R_1$ and the $R_2$ preferably contains at least one site bonded to a group containing a structure derived from a polymerizable group.

In an embodiment of the present invention, the photoresponsive polymer has the azomethine derivative-derived structural unit represented by the general formula (1) as a side chain in a repeating unit in the photoresponsive polymer.

In an embodiment of the present invention, the photoresponsive polymer has at least one site bonded to a group containing a structure derived from a polymerizable group in at least one of $R_1$ and $R_2$ in the structural unit represented by the general formula (1). For example, the aromatic hydrocarbon group constituting $R_1$ or the aromatic heterocyclic group constituting $R_2$ has at least one site bonded to a group containing a structure derived from a polymerizable group. Examples of the structure derived from a polymerizable group include a structure derived from a (meth)acrylate, a structure derived from an olefin, and a structure derived from a vinyl ester. In an embodiment of the present invention, the photoresponsive polymer contains a structure derived from a (meth)acrylate. Such an embodiment has a technical effect that polymerization is easy.

In an embodiment of the present invention, the photoresponsive polymer contains a structural unit represented by the following general formula (2):

[Chemical formula 4]

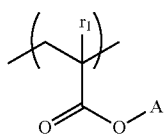

General formula (2)

in the general formula (2), $r_1$ represents a hydrogen atom or a methyl group, and A is represented by any one of the following general formulas (1-1) to (1-4):

[Chemical formula 5]

$*—R_1—Z_1=Z_2—R_2$        General formula (1-1)

$*\text{-}G\text{-}R_1—Z_1=Z_2—R_2$        General formula (1-2)

$*—R_2—Z_2=Z_1—R_1$        General formula (1-3)

$*\text{-}G\text{-}R_2—Z_2=Z_1—R_1$        General formula (1-4)

in which

\* represents a bonding point, G represents a divalent group, and $Z_1$ and $Z_2$ each represent CH or N, $Z_1 \neq Z_2$, $R_1$ represents an aromatic hydrocarbon group having a substituent $R_a$ selected from the group consisting of an alkyl group, an alkoxy group, and a halogen atom at each of two ortho positions with respect to $Z_1$, and $R_2$ represents an aromatic heterocyclic group with or without a substituent. With such an embodiment, the desired effect of the present invention can be efficiently exhibited.

Here, the general formula (1-2) is described with reference to one of the following specific examples. Typically, the general formula (1-2) is represented by the following formula:

[Chemical formula 6]

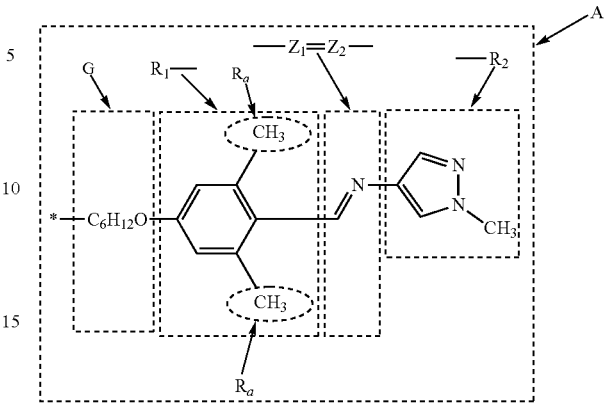

"$R_1—$", "$—Z_1=Z_2—$", and "$—R_2$" are as described above, and G as a divalent group represents an oxyalkylene group having 6 carbon atoms. The structural unit represented by general formula (1-2) is bonded to a structural unit derived from a (meth)acrylate using the oxyalkylene group as a bonding point.

Hereinafter, the structural unit represented by general formula (1), particularly general formula (2) will be further described.

($Z_1$ and $Z_2$)

In an embodiment of the present invention, as described above, $Z_1$ and $Z_2$ each represent CH or N, provided that $Z_1 \neq Z_2$. When $Z_1$ represents CH and $Z_2$ represents N, photomeltability tends to be excellent, which is more preferable.

($R_1$ and $R_2$)

In an embodiment of the present invention, as described above, $R_1$ represents an aromatic hydrocarbon group having a substituent $R_a$ selected from the group consisting of an alkyl group, an alkoxy group, and a halogen atom at each of two ortho positions with respect to $Z_1$, and $R_2$ represents an aromatic heterocyclic group with or without a substituent.

In an embodiment of the present invention, the aromatic hydrocarbon group is not particularly limited as long as the aromatic hydrocarbon group has the predetermined substituent $R_a$ at each of two ortho positions with respect to $Z_1$, but an aromatic hydrocarbon group derived from an aromatic hydrocarbon having 6 to 30 carbon atoms is preferable, and examples thereof include groups derived from structures such as benzene, naphthalene, anthracene, phenanthrene, pyrene, and biphenyl. Among these groups, groups derived from benzene, naphthalene, and phenanthrene are preferable from a viewpoint of easily developing packing between molecular chains, exhibiting high thermal mobility when trans-cis isomerized, and easily inducing a fluidization phenomenon.

The number of carbon atoms of the alkyl group as the $R_a$ is not particularly limited. However, for example, the alkyl group is an alkyl group having 1 to 10 carbon atoms, and preferably an alkyl group having 1 to 5 carbon atoms. The number of carbon atoms of the alkoxy group as the $R_a$ is not particularly limited. However, for example, the alkoxy group is an alkoxy group having 1 to 10 carbon atoms, and preferably an alkoxy group having 1 to 5 carbon atoms. Within the above range, the effect of the present invention can be more remarkably obtained. In addition, synthesis is easy, which is preferable. Therefore, in a preferred embodiment of the present invention, $R_a$ represents an alkyl group having 1 to 5 carbon atoms, an alkoxy group having 1 to 5 carbon atoms, or a halogen atom. Above all, $R_a$ preferably represents an alkyl group having 1 to 5 carbon atoms or an alkoxy group having 1 to 5 carbon atoms because fluidization is more likely to occur, and fixability and image stability when used in a toner are better.

Note that the substituents $R_a$ present at two ortho positions with respect to $Z_1$ may be the same as or different from each other. The two substituents $R_a$ are each preferably selected from the group consisting of an alkyl group having 1 to 5 carbon atoms, an alkoxy group having 1 to 5 carbon atoms, and a halogen atom.

Examples of the alkyl group having 1 to 10 carbon atoms include a methyl group, an ethyl group, a n-propyl group, a n-butyl group, an isobutyl group, a n-pentyl group, a n-hexyl group, a n-heptyl group, a n-octyl group, a n-nonyl group, a n-decyl group, an isopropyl group, a sec-butyl group, and a t-butyl group. Examples of the alkoxy group having 1 to 10 carbon atoms include a methoxy group, an ethoxy group, an n-propoxy group, an n-butoxy group, an n-pentyloxy group, a n-hexyloxy group, a n-heptyloxy group, an n-octyloxy group, a n-nonyloxy group, a n-decyloxy group, a 1-methylpentyloxy group, and a 4-methyl-2 pentyloxy group. Examples of the halogen atom include a fluorine atom, a chlorine atom, a bromine atom, and an iodine atom.

In an embodiment of the present invention, the aromatic heterocyclic group is not particularly limited, but preferably has 2 to 30 carbon atoms. In addition, the aromatic heterocyclic group preferably has a high electron donating property, and examples thereof include groups derived from structures such as thiophene, furan, pyrrole, pyrazole, imidazole, pyridine, pyrimidine, pyrazine, triazine, benzothiophene, benzimidazole, indole, isoindole, quinoline, isoquinoline, quinazoline, quinoxaline, naphthyridine, acridine, carbazole, and dibenzothiophene.

In an embodiment of the present invention, the aromatic hydrocarbon group may have a substituent in addition to $R_a$. The aromatic heterocyclic group may be a group with or without a substituent. These substituents are not particularly limited, but examples thereof include a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, and an alkoxycarbonyl group having 2 to 19 carbon atoms. Preferable examples thereof include a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, and an alkoxycarbonyl group having 2 to 19 carbon atoms. At this time, at least one of the substituents is preferably a halogen atom, a cyano group, a nitro group, an alkyl group having 1 to 18 carbon atoms, an alkoxy group having 1 to 18 carbon atoms, or a dialkylamino group having 2 to 10 carbon atoms. With such a structure, it is considered that cis-trans isomerization more easily proceeds and fluidization more easily occurs. At least one of the substituents is more preferably an alkyl group having 1 to 18 carbon atoms, an alkoxy group having 1 to 18 carbon atoms, or a dialkylamino group having 2 to 10 carbon atoms among these groups because of having high thermal mobility.

As the number of carbon atoms of the substituent, the alkyl group is more preferably an alkyl group having 1 to 12 carbon atoms, and still more preferably an alkyl group having 4 to 8 carbon atoms. The alkoxy group is more preferably an alkoxy group having 1 to 12 carbon atoms, and still more preferably an alkoxy group having 4 to 8 carbon atoms. The dialkylamino group is more preferably a dialkylamino group having 2 to 8 carbon atoms, and still more preferably a dialkylamino group having 4 to 6 carbon atoms. The acyl group is more preferably an acyl group having 2 to 13 carbon atoms, and still more preferably an acyl group having 5 to 13 carbon atoms. The alkoxycarbonyl group is more preferably an alkoxycarbonyl group having 2 to 13 carbon atoms, and still more preferably an alkoxycarbonyl group having 5 to 13 carbon atoms. As described above, by introducing a long-chain substituent, a crystal easily collapses, photomeltability is improved, and fixability is enhanced.

The alkyl group having 1 to 18 carbon atoms is not particularly limited, and examples thereof include linear alkyl groups such as a methyl group, an ethyl group, a n-propyl group, a n-butyl group, an isobutyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, and a n-hexadecyl group; and branched alkyl groups such as an isopropyl group, a sec-butyl group, a t-butyl group, a 1-methylpentyl group, a 4-methyl-2-pentyl group, a 3,3-dimethylbutyl group, a 2-ethylbutyl group, a 1-methylhexyl group, a t-octyl group, a 1-methylheptyl group, a 2-ethylhexyl group, a 2-propylpentyl group, a 2,2-dimethylheptyl group, a 2,6-dimethyl-4-heptyl group, a 3,5,5-trimethylhexyl group, a 1-methyldecyl group, and a 1-hexylheptyl group.

Examples of the alkoxy group having 1 to 18 carbon atoms include linear alkoxy groups such as a methoxy group, an ethoxy group, a n-propoxy group, a n-butoxy group, a n-hexyloxy group, a n-heptyloxy group, a n-octyloxy group, a n-nonyloxy group, a n-decyloxy group, a n-undecyloxy group, a n-dodecyloxy group, a n-tridecyloxy group, a n-tetradecyloxy group, a n-pentadecyloxy group, and a n-hexadecyloxy group; and branched alkoxy groups such as a 1-methylpentyloxy group, a 4-methyl-2-pentyloxy group, a 3,3-dimethylbutyloxy group, a 2-ethylbutyloxy group, a 1-methylhexyloxy group, a t-octyloxy group, a 1-methylheptyloxy group, a 2-ethylhexyloxy group, a 2-propylpentyloxy group, a 2,2-dimethylheptyloxy group, a 2,6-dimethyl-4-heptyloxy group, a 3,5,5-trimethylhexyloxy group, a 1-methyldecyloxy group, and a 1-hexylheptyloxy group.

Examples of the alkylamino group having 1 to 10 carbon atoms include a methylamino group, an ethylamino group, a n-propylamino group, a n-butylamino group, an isobutylamino group, a n-hexylamino group, a n-heptylamino group, a n-octylamino group, a n-nonylamino group, and a n-decylamino group.

Examples of the dialkylamino group having 2 to 10 carbon atoms include a dimethylamino group, a diethylamino group, a di-n-propylamino group, a di-n-butylamino group, a di-isobutylamino group, and a methylethylamino group.

The acyl group having 2 to 19 carbon atoms is, for example, a saturated or unsaturated linear or branched acyl group, and examples thereof include an acetyl group, a propanoyl group (propionyl group), a butanoyl group (butyryl group), an isobutanoyl group (isobutyryl group), a pentanoyl group (valeryl group), an isopentanoyl group (isovaleryl group), a sec-pentanoyl group (2-methylbutyryl group), a t-pentanoyl group (pivaloyl group), a hexanoyl group, a heptanoyl group, an octanoyl group, a t-octanoyl group (2,2-dimethylhexanoyl group), a 2-ethylhexanoyl group, a nonanoyl group, an isononanoyl group, a decanoyl group, an isodecanoyl group, an undecanoyl group, a lauroyl group, a myristoyl group, a palmitoyl group, a stearoyl group, a behenoyl group, an undecylenoyl group, and an oleoyl group.

The alkoxycarbonyl group having 2 to 19 carbon atoms is, for example, linear or branched, and examples thereof include linear alkoxycarbonyl groups such as a methoxycarbonyl group, an ethoxycarbonyl group, a n-butoxycarbonyl group, a n-hexyloxycarbonyl group, a n-heptyloxycarbonyl group, a n-octyloxycarbonyl group, a n-nonyloxycarbonyl group, a n-decyloxycarbonyl group, a n-undecyloxycarbonyl group, a n-dodecyloxycarbonyl group, a n-tridecyloxycarbonyl group, a n-tetradecyloxycarbonyl group, a n-pentadecyloxycarbonyl group, and a n-hexadecyloxycarbonyl group; and branched alkoxycarbonyl groups such as a 1-methylpentyloxycarbonyl group, a 4-methyl-2-pentyloxycarbonyl group, a 3,3-dimethylbutyloxycarbonyl group, a 2-ethylbutyloxycarbonyl group, a 1-methylhexyloxycarbonyl group, a t-octyloxycarbonyl group, a 1-methylheptyloxycarbonyl group, a 2-ethylhexyloxycarbonyl group, a 2-propylpentyloxycarbonyl group, a 2,2-dimethylheptyloxycarbonyl group, a 2,6-dimethyl-4-heptyloxycarbonyl group, a 3,5,5-trimethylhexyloxycarbonyl group, a 1-methyldecyloxycarbonyl group, and a 1-hexylheptyloxycarbonyl group.

In a preferred embodiment of the present invention, $R_2$ preferably has at least one carbon atom constituting a ring structure of the aromatic heterocyclic group, bonded adjacent to a carbon atom bonded to a carbon atom or a nitrogen atom of $Z_2$, and bonded to a hydrogen atom. That is, at least one carbon atom bonded adjacent to the carbon atom bonded to $Z_2$ in the aromatic heterocyclic structure is preferably bonded to a hydrogen atom. As a result, since the cis form is further stabilized, fluidization due to photoisomerization is more effectively induced, and the effect of the present invention can be more remarkably obtained. $R_2$ more preferably has two carbon atoms each constituting a ring structure of the aromatic heterocyclic group, bonded adjacent to a carbon atom bonded to a carbon atom or a nitrogen atom of $Z_2$, and bonded to a hydrogen atom. As a result, the effect of the present invention can be obtained still more remarkably.

($r_1$)

In an embodiment of the present invention, as described above, $r_1$ in general formula (2) represents a hydrogen atom or a methyl group. In such an embodiment, $r_1$ preferably represents a hydrogen atom from a viewpoint of high fluidity and excellent fixability when trans-cis isomerization is performed.

(A)

In an embodiment of the present invention, as described above, A represents any one of:

[Chemical formula 7]

*—$R_1$—$Z_1$=$Z_2$—$R_2$    General formula (1-1)

*-G-$R_1$—$Z_1$=$Z_2$—$R_2$    General formula (1-2)

*—$R_2$—$Z_2$=$Z_1$—$R_1$    General formula (1-3)

*-G-$R_2$—$Z_2$=$Z_1$—$R_1$    General formula (1-4)

in which
* represents a bonding point, G represents a divalent group, $Z_1$ and $Z_2$ each represent CH or N, and $Z_1/Z_2$, $R_1$ represents an aromatic hydrocarbon group having a substituent $R_a$ selected from the group consisting of an alkyl group, an alkoxy group, and a halogen atom at each of two ortho positions with respect to $Z_1$, and $R_2$ represents an aromatic heterocyclic group with or without a substituent.

In an embodiment of the present invention, the G is not particularly limited as long as the G represents a divalent group, but preferably represents an alkylene group having 1 to 18 carbon atoms or an oxyalkylene group having 1 to 18 carbon atoms. According to such an embodiment, the polymer according to an embodiment of the present invention has high thermal mobility and excellent photomeltability. In an embodiment of the present invention, the G represents an alkylene group having 2 to 16 carbon atoms, an alkylene group having 3 to 14 carbon atoms, or an alkylene group having 4 to 12 carbon atoms. In an embodiment of the present invention, the oxyalkylene group is represented by -(E-O)$_n$—, E represents an alkylene group having 1 to 18 carbon atoms (2 to 16 carbon atoms, 3 to 14 carbon atoms, or 4 to 12 carbon atoms), and n is 1 to 3 and preferably 1. An oxygen atom side is preferably a bonding point in the general formulas (1-2) and (1-4).

In an embodiment of the present invention, as an example of the alkylene group having 1 to 18 carbon atoms, a group obtained by removing one hydrogen atom from the group described as an example of the alkyl group having 1 to 18 carbon atoms is suitable.

In a preferred embodiment of the present invention, the A has a structure represented by the general formula (1-1) or (1-2). It is preferable to have a polymerizable site on the aromatic hydrocarbon group side because fluidization by light irradiation tends to easily occur.

In an embodiment of the present invention, when the A is represented by the general formula (1-1) or (1-2), the $R_2$ preferably has a structure represented by the following formula.

[Chemical formula 8]

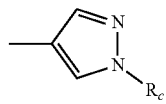

In the formula, $R_c$ represents a hydrogen atom, an alkyl group having 1 to 18 carbon atoms, or an alkoxy group having 1 to 18 carbon atoms. As a result, the desired effects of the present invention (particularly, effects of improving fixability and image stability when used in a toner) are efficiently exhibited. Above all, $R_c$ preferably represents an alkyl group having 1 to 18 carbon atoms.

<Method for Manufacturing Photoresponsive Polymer>

A method for manufacturing the photoresponsive polymer according to an embodiment of the present invention is not particularly limited. However, for example, the photoresponsive polymer according to an embodiment of the present invention can be obtained by preparing an azomethine derivative monomer having a polymerizable group and having a predetermined structure, and polymerizing the azomethine derivative monomer by a conventionally known method.

That is, an embodiment of the present invention provides a method for manufacturing the polymer according to an embodiment of the present invention, the method including preparing an azomethine derivative monomer represented by any one of the following general formulas (1-1') to (1-4'), and polymerizing the azomethine derivative monomer:

[Chemical formula 9]

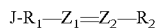  General formula (1-1')

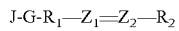  General formula (1-2')

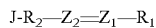  General formula (1-3')

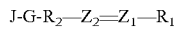  General formula (1-4')

in the general formulas (1-1') to (1-4'),

J represents a polymerizable group, G represents a divalent group, $Z_1$ and $Z_2$ each represent CH or N, and $Z_1 \neq Z_2$, $R_1$ represents an aromatic hydrocarbon group having a substituent $R_a$ selected from the group consisting of an alkyl group, an alkoxy group, and a halogen atom at each of two ortho positions with respect to $Z_1$, and $R_2$ represents an aromatic heterocyclic group with or without a substituent. Specific forms of the G are similar to those described above. Specific forms of the aromatic hydrocarbon group, the aromatic heterocyclic group, and the substituent $R_a$ are similar to those described above. Examples of the polymerizable group include a (meth)acryloyl group, a vinyl group, and a group containing these groups.

(Specific Example of Method for Preparing Azomethine Derivative Having Polymerizable Group)

The azomethine derivative having a polymerizable group can be prepared by preparing an azomethine derivative represented by general formula (1) and introducing a polymerizable group into the azomethine derivative.

For example, when an azomethine derivative in which $R_1$ contains a benzene ring having the predetermined substituent $R_a$, $Z_1$ represents NH, $Z_2$ represents C, and $R_2$ contains a pyrazole ring is prepared, as a first step, an aniline derivative having the predetermined substituent $R_a$ is reacted with a pyrazole carbaldehyde derivative. At this time, when either the aniline derivative or the pyrazole carbaldehyde derivative has an OH group as a substituent, a polymerizable group can be easily introduced into the position of the OH group.

In addition, for example, when an azomethine derivative in which $R_1$ contains a benzene ring having the predetermined substituent $R_a$, $Z_1$ represents C, $Z_2$ represents NH, and $R_2$ contains a pyrazole ring is prepared, as a first step, a benzaldehyde derivative having the predetermined substituent $R_a$ is reacted with an aminopyrazole derivative. At this time, when either the benzaldehyde derivative or the aminopyrazole derivative has an OH group as a substituent, a polymerizable group can be easily introduced into the position of the OH group.

For example, as indicated in the following formula, 2,6-dimethyl-4-hydroxybenzaldehyde and 4-amino-1-methylpyrazole are treated (reacted with each other by heating and refluxing) in a solvent such as methanol or ethanol, the reaction liquid is filtered, the obtained powder is washed with cooling ethanol, and recrystallized with methanol/ethanol to obtain a target product.

[Chemical formula 10]

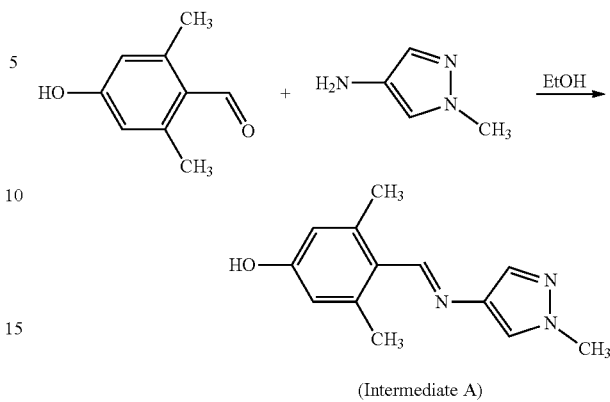

(Intermediate A)

Thereafter, as a second stage, a polymerizable group is introduced into the above intermediate A. A method for introducing a polymerizable group is not particularly limited. For example, when a linker —O—$C_6H_{12}$— is first introduced into the above intermediate A, for example, Cl—$C_6H_{12}$—OH is allowed to act as a halogenated alcohol compound to obtain the following intermediate B.

Reaction conditions are not particularly limited, but the reaction is caused preferably within a range of 10° C. or higher and 150° C. or lower, more preferably within a range of 50° C. or higher and 140° C. or lower, still more preferably within a range of 80° C. or higher and 130° C. or lower in the presence of potassium carbonate and potassium iodide in a solvent such as dimethylformamide (DMF). Note that as the order of adding potassium carbonate and potassium iodide, potassium carbonate is preferably added first. After potassium carbonate is added and before potassium iodide is added, stirring is performed preferably within a range of 0° C. or higher and 100° C. or lower, more preferably within a range of 0° C. or higher and 60° C. or lower, still more preferably within a range of 0° C. or higher and 40° C. or lower.

[Chemical formula 11]

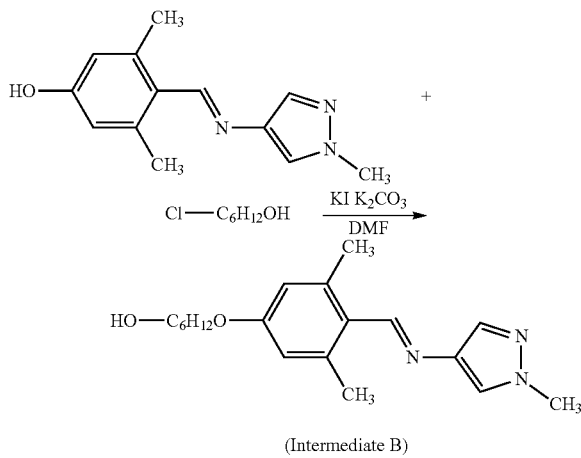

(Intermediate B)

Thereafter, as a third stage, the intermediate B is reacted with a compound for constituting a polymerizable group, for example, an acrylic acid halide or a methacrylic acid halide. As a result, the photoresponsive polymer contains a structural unit derived from a (meth)acrylate. At this time, reaction conditions are not particularly limited. For example, the reaction is preferably caused in a known organic solvent in the presence of a tertiary amine such as triethylamine or triethanolamine. Preferably, a compound for constituting a polymerizable group, such as an acrylic acid halide or a methacrylic acid halide, is dropwise added to and mixed with a mixed solution containing the above intermediate B, a tertiary amine, and a solvent while the temperature of the mixed solution is kept at 0 to 10° C. Thereafter, the mixed solution is reacted, for example, at room temperature for about 5 to 10 hours to obtain an azomethine derivative having a polymerizable group.

[Chemical formula 12]

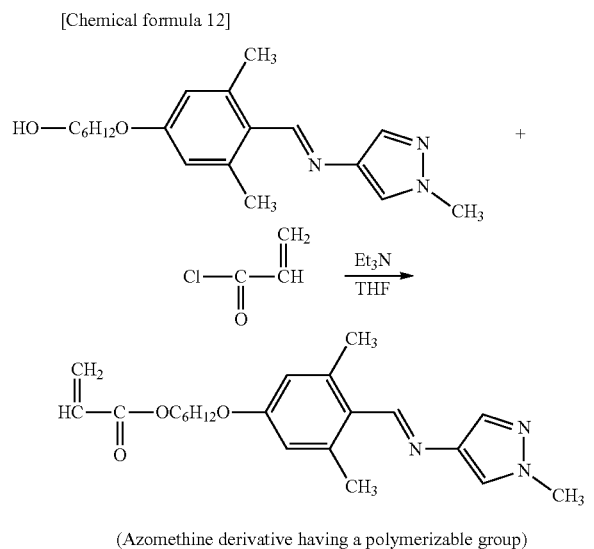

(Azomethine derivative having a polymerizable group)

Note that in the above first stage, by changing the raw material used to another compound, a desired azomethine derivative can be obtained.

By changing the compounds to be added in the second stage and the third stage, a group having a polymerizable group having a different structure can be introduced. A person skilled in the art can synthesize an azomethine derivative having a desired polymerizable group by appropriately making the above changes and selecting appropriate reaction conditions.

By appropriately selecting a raw material to be used in the above first stage, a polymerizable group can be introduced into the intermediate A without performing the second stage.

An embodiment of the present invention is a photoresponsive polymer containing a structural unit represented by the following general formula (1), fluidized by light irradiation, and reversibly non-fluidized:

[Chemical formula 13]

$$R_1—Z_1=Z_2—R_2 \qquad \text{General formula (1)}$$

(in general formula (1), $Z_1$ and $Z_2$ each represent CH or N, $Z_1 \neq Z_2$, $R_1$ represents an aromatic hydrocarbon group having a substituent $R_a$ selected from the group consisting of an alkyl group, an alkoxy group, and a halogen atom at each of two ortho positions with respect to $Z_1$, $R_2$ represents an aromatic heterocyclic group with or without a substituent, and at least one of the $R_1$ and the $R_2$ is bonded to a group containing a structure derived from a polymerizable group, provided that the following polymers (high molecular weight compounds) (1) to (4) are excluded:

(1) a polymer containing an azomethine derivative-derived structural unit represented by the following chemical formula (1) and having a polymerizable group, and reversibly fluidized/non-fluidized by light irradiation:

[Chemical formula 14]

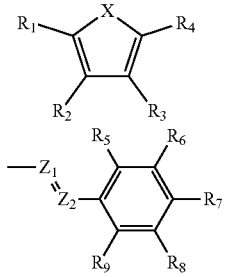

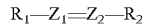

in the chemical formula (1),
X represents $NR_{10}$, O, or S,
$R_1$ and $R_2$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms,
one of $R_3$ and $R_4$ represents a group represented by Y, and the other represents a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms,
$R_{10}$ represents a group having a polymerizable group, a hydrogen atom, a halogen atom, a hydroxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms,
$Z_1$ and $Z_2$ each represent N or CH, and $Z_1 \neq Z_2$,
$R_5$ to $R_7$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms,
$R_8$ and $R_9$ each independently represent a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms,
in which at least one of $R_1$, $R_2$, $R_5$ to $R_7$, $R_{10}$, and either $R_3$ or $R_4$ that is not selected as the group represented by Y represents a group having a polymerizable group, when at least one of $R_1$, $R_2$, $R_{10}$, and either $R_3$ or $R_4$ that is not selected as the group represented by Y represents a group having a polymerizable group, those other than the group having a polymerizable group and the group represented by Y among $R_1$, $R_2$, $R_{10}$, and either $R_3$ or $R_4$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms, provided that $R_{10}$ is selected from a hydrogen atom, a halogen atom, a hydroxy group, a carboxy group, an alkyl group having 1 to 4 carbon atoms, or an alkoxy group having 1 to 4 carbon atoms, when at least one of $R_5$ to $R_7$ represents a group having a polymerizable group, those other than the polymerizable group among $R_5$ to $R_7$ and $R_8$ and $R_9$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms, and $R_5$ and $R_9$ are each independently selected from the group consisting of an alkyl group, an alkoxy group, and a halogen atom.

(2) A high molecular weight compound represented by the following general formula (1) and reversibly fluidized/non-fluidized by light irradiation:

[Chemical formula 15]

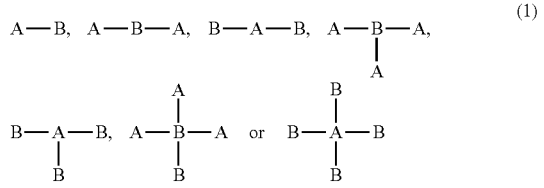

(1)

In the general formula (1), A represents a polymer block containing an azomethine derivative-derived structural unit represented by chemical formula (2) and having a polymerizable group, and B represents a polymer block not containing an azomethine derivative-derived structure represented by the chemical formula (2):

[Chemical formula 16]

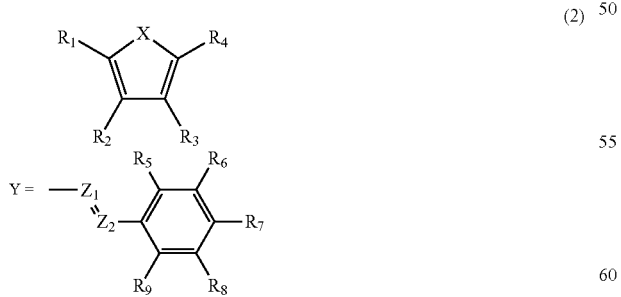

(2)

in the chemical formula (2),
X represents $NR_{10}$, O, or S,
$R_1$ and $R_2$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms, one of $R_3$ and $R_4$ represents a group represented by Y, and the other represents a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms, $R_{10}$ represents a group having a polymerizable group, a hydrogen atom, a halogen atom, a hydroxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms, $Z_1$ and $Z_2$ each represent N or CH, and $Z_1 \neq Z_2$, $R_5$ to $R_7$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms, $R_8$ and $R_9$ each independently represent a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms, in which at least one of $R_1$, $R_2$, $R_5$ to $R_7$, $R_{10}$, and either $R_3$ or $R_4$ that is not selected as the group represented by Y represents a group having a polymerizable group, when at least one of $R_1$, $R_2$, $R_{10}$, and either $R_3$ or $R_4$ that is not selected as the group represented by Y is a group having a polymerizable group, those other than the group having a polymerizable group and the group represented by Y among $R_1$, $R_2$, $R_{10}$, and either $R_3$ or $R_4$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms, provided that $R_{10}$ is selected from a hydrogen atom, a halogen atom, a hydroxy group, a carboxy group, an alkyl group having 1 to 4 carbon atoms, or an alkoxy group having 1 to 4 carbon atoms, when at least one of $R_5$ to $R_7$ represents a group having a polymerizable group, those other than the polymerizable group among $R_5$ to $R_7$ and $R_8$ and $R_9$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms, and $R_5$ and $R_9$ are each independently selected from the group consisting of an alkyl group, an alkoxy group, and a halogen atom.

(3) A photoresponsive polymer containing a structural unit represented by the following general formula (1), fluidized by light irradiation, and reversibly non-fluidized:

[Chemical formula 17]

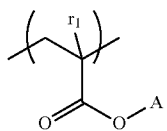

General formula (1)

in general formula (1), $r_1$ represents a hydrogen atom or a methyl group, and

A represents a group having an azomethine structure represented by the following general formula (2),

[Chemical formula 18]

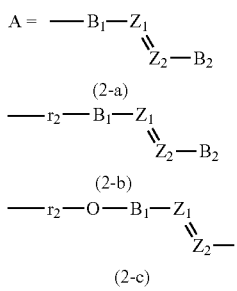

General formula (2)

in general formula (2), $Z_1$ and $Z_2$ each independently represent N or CH, and $Z_1 \neq Z_2$, $B_1$ represents a divalent aromatic hydrocarbon group with or without a substituent or a divalent aromatic heterocyclic group with or without a substituent, $B_2$ represents a monovalent aromatic hydrocarbon group with or without a substituent or a monovalent aromatic heterocyclic group with or without a substituent, and $-B_1-Z_1=Z_2-B_2$ represents any one of the following structures 2 to 5,

[Chemical formula 19]

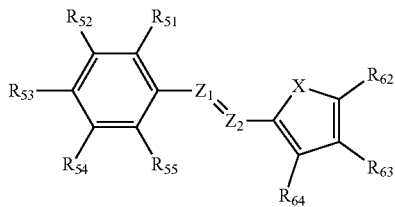

(Structure 2)

(in structure 2, $Z_1$ and $Z_2$ each represent N or CH, and $Z_1 \neq Z_2$, $R_{53}$ represents a linking moiety with an oxygen atom (in a case of (2-a) or (2-c)) or $r_2$ (in a case of (2-b)) in general formula (1), X represents S, O, or $NR_{61}$, and $R_{61}$ represents a hydrogen atom, an alkyl group having 1 to 18 carbon atoms, or an alkoxycarbonyl group having 2 to 19 carbon atoms, $R_{62}$ to $R_{64}$ each independently represent a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms (in an embodiment, $R_{62}$ to $R_{64}$ each represent a hydrogen atom), $R_{51}$ and $R_{55}$ are each independently selected from the group consisting of a halogen atom, an alkyl group, and an alkoxy group, $R_{52}$ and $R_{54}$ each independently represent a hydrogen atom, a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, or an alkoxycarbonyl group having 2 to 19 carbon atoms.)

[Chemical formula 20]

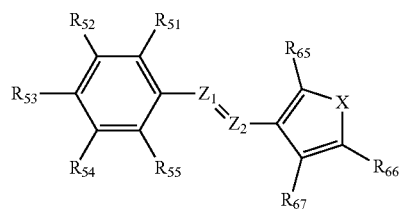

(Structure 3)

(in structure 3, $Z_1$, $Z_2$, X, and $R_{51}$ to $R_{55}$ are similar to those in the structure 2, and $R_{65}$ to $R_{67}$ each independently represent a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.)

[Chemical formula 21]

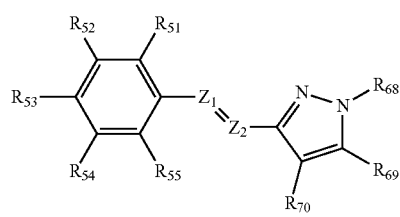

(Structure 4)

(in structure 4, $Z_1$, $Z_2$, and $R_{51}$ to $R_{55}$ are similar to those in the structure 2, $R_{68}$ to $R_{70}$ each independently represent a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms, and in an embodiment, $R_{68}$ to $R_{70}$ each represent a hydrogen atom.)

[Chemical formula 22]

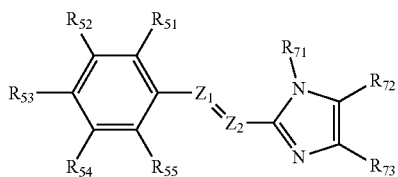

(Structure 5)

(in structure 5, $Z_1$, $Z_2$, and $R_{51}$ to $R_{55}$ are similar to those in the structure 2, and
$R_{71}$ to $R_{73}$ each independently represent a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.)
$r_2$ represents an alkylene group having 1 to 18 carbon atoms, and a compound in which a hydrogen atom is bonded instead of an oxygen atom bonded to A in general formula (1) has an activation energy Ea represented by the following formula (1) of 60 kJ/mol or more.

Ea (kJ/mol)=(total energy at TS (kJ/mol))−(total energy of cis form (kJ/mol))     Formula (1):

In the formula (1), TS refers to a transition state represented by general formula (3), and the cis form refers to an isomer represented by general formula (4);

General formula (3)

[Chemical formula 23]

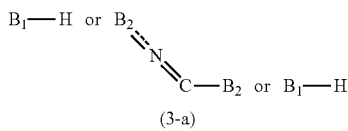
(3-a)
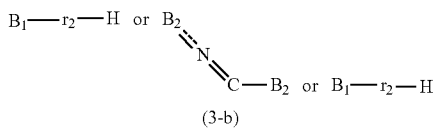
(3-b)
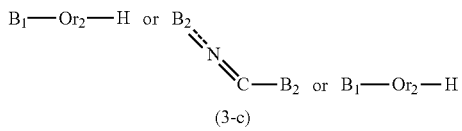
(3-c)

General formula (4)

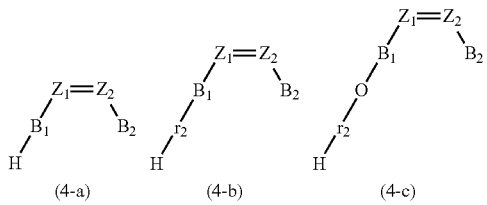
(4-a)          (4-b)          (4-c)

(Note that in calculation of the activation energy Ea represented by the following formula (1), as a molecular structure of the cis form, the most stable molecular structure of an isomer represented by the general formula (4) is calculated, and the total energy of the molecular structure is defined as the total energy of the cis form, and as a molecular structure at TS, for a transition state represented by general formula (3), a saddle point of a corresponding molecular structure is calculated, and the total energy obtained at this time is defined as the total energy at TS. At this time, for calculating the molecular structure of the cis form, the total energy of the cis form, the molecular structure at TS, and the total energy at TS, software of Gaussian 16 manufactured by Gaussian Inc. can be used, and calculation can be performed using density functional theory (B3LYP/6-31G(d)) as a calculation method.):

(4) A photoresponsive polymer containing a structural unit represented by the following general formula (2), fluidized by light irradiation, and reversibly non-fluidized:

[Chemical formula 24]

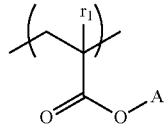

General formula (2)

in the general formula (2),
$r_1$ represents a hydrogen atom, and
A is represented by the following formula.

[Chemical formula 25]

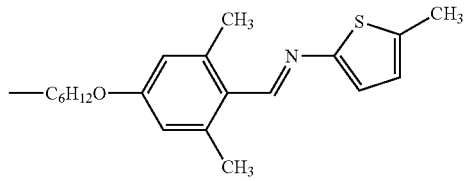

(Other Structural Units)

In an embodiment of the present invention, the photoresponsive polymer may contain a structural unit other than the azomethine derivative-derived structural unit represented by the general formula (1) (another structural unit). In a case of a copolymer containing another structural unit, an arrangement form of repeating units of the copolymer is not particularly limited, and the copolymer may be any of a random copolymer, a block copolymer, and an alternating copolymer.

The other structural unit is preferably a structural unit not containing the azomethine derivative-derived structural unit represented by general formula (1), and more preferably a structural unit constituting a thermoplastic resin softened by heating.

The other structural unit preferably has a vinyl-based polymerizable group because a copolymer is easily synthesized. That is, in an embodiment of the present invention, the photoresponsive polymer further contains another structural unit derived from a monomer having a vinyl-based polymerizable group. Specific examples thereof include a styrene derivative, a (meth)acrylic acid derivative, an olefin derivative, a vinyl ester derivative, a vinyl ether derivative, and a vinyl ketone derivative, and a structural unit derived from a styrene derivative, a (meth)acrylic acid derivative, or an olefin derivative is preferable. That is, in an embodiment of the present invention, the monomer having a vinyl-based polymerizable group is at least one selected from the group consisting of a styrene derivative, a (meth)acrylic acid derivative, and an olefin derivative. With such an embodiment, the desired effect of the present invention is efficiently exhibited.

Examples of the styrene derivative include styrene, o-methylstyrene, m-methylstyrene, p-methylstyrene, α-methylstyrene, p-phenylstyrene, p-ethylstyrene, 2,4-dimethylstyrene, p-t-butylstyrene, p-n-hexylstyrene, p-n-octylstyrene, p-n-nonylstyrene, p-n-decylstyrene, and p-n-dodecylstyrene.

Examples of the (meth)acrylic acid derivative include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-hexyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, and dimethylaminoethyl (meth)acrylate.

Examples of the olefin derivative include ethylene, propylene, n-butylene, isobutylene, n-pentene, and 3-methyl-1-pentene. The olefin derivative may be linear or branched, and the number of carbon atoms in the chain is not particularly limited.

Examples of the vinyl ester derivative include vinyl propionate, vinyl acetate, and vinyl benzoate. Examples of the vinyl ether derivative include vinyl methyl ether and vinyl ethyl ether. Examples of the vinyl ketone derivative include vinyl methyl ketone, vinyl ethyl ketone, and vinyl hexyl ketone.

The content of the other structural unit in the polymer is not particularly limited and can be appropriately selected, but is preferably 70% by mass or less, and more preferably 40% by mass or less with respect to 100% by mass of the total amount of all structural units constituting the polymer. In an embodiment of the present invention, the content of the other structural unit in the polymer may be 5% by mass or more or 15% by mass or more.

In an embodiment of the present invention, the number average molecular weight Mn of the photoresponsive polymer is not particularly limited, but is 3000 or more, 3500 or more, 4000 or more, 5000 or more, or 10,000 or more. In an embodiment of the present invention, the number average molecular weight Mn of the photoresponsive polymer is not particularly limited, but is 100000 or less, 70000 or less, 50000 or less, 40000 or less, or 30000 or less. When the number average molecular weight of the polymer is 3000 or more, a toner image having excellent toughness and excellent fixability when the polymer is used as a toner can be more easily obtained, which is preferable. When the number average molecular weight is 100000 or less, the efficiency of isomerization and softening and melting is high, which is preferable.

The number average molecular weight of the polymer according to an embodiment of the present invention can be measured by gel permeation chromatography (GPC). Specifically, the number average molecular weight can be measured by a method described in Examples described later.

(Method for Preparing Polymer)

A method for synthesizing the polymer according to an embodiment of the present invention is not particularly limited, and a method for polymerizing the azomethine derivative having a polymerizable group and represented by general formula (1) as a monomer using a known polymerization initiator, such as anionic polymerization, cationic polymerization, or living radical polymerization, can be used. A known chain transfer agent may be used as necessary.

Examples of the polymerization initiator include the following azo-based or diazo-based polymerization initiator and peroxide-based polymerization initiator.

Examples of the azo-based or diazo-based polymerization initiator include 2,2'-azobis-(2,4-dimethylvaleronitrile), an azobisisobutyronitrile (AIBN) such as 2,2'-azobisisobutyronitrile, 1,1'-azobis(cyclohexane-1-carbonitrile), and 2,2'-azobis-4-methoxy-2,4-dimethylvaleronitrile.

Examples of the peroxide-based polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl) propane, and tris-(t-butylperoxy) triazine.

Examples of the chain transfer agent include benzyl dithiobenzoate, 1-phenylethyl dithiobenzoate, 2-phenylprop-2-yl dithiobenzoate, 1-acetoxyethyl dithiobenzoate, hexakis(thiobenzoylthiomethyl) benzene, 1,4-bis(thiobenzoylthiomethyl) benzene, 1,2,4,5-tetrakis(thiobenzoylthiomethyl) benzene, 1,4-bis-(2-(thiobenzoylthio) prop-2-yl) benzene, 1-(4-methoxyphenyl) ethyl dithiobenzoate, benzyl dithioacetate, ethoxycarbonylmethyl dithioacetate, 2-(ethoxycarbonyl) prop-2-yl dithiobenzoate, 2-cyanoprop-2-yl dithiobenzoate, t-butyl dithiobenzoate, 2,4,4-trimethylpent-2-yl dithiobenzoate, 2-(4-chlorophenyl) prop-2-yl dithiobenzoate, 3- and 4-vinyl benzyl dithiobenzoate, S-benzyldiethoxyphosphinyl dithioformate, t-butyltrithioperbenzoate, 2-phenylprop-2-yl 4-chloro dithiobenzoate, 2-phenylprop-2-yl 1-dithionaphthalate, 4-cyanopentanoic acid dithiobenzoate, dibenzyltetrathioterephthalate, dibenzyltrithiocarbonate, and carboxymethyl dithiobenzoate.

Polymerization temperature varies depending on the types of monomer and polymerization initiator used, but is preferably 50 to 100° C., and more preferably 55 to 90° C. Polymerization time varies depending on the types of monomer and polymerization initiator used, but is preferably 2 to 60 hours, for example.

Note that a method for preparing a copolymer containing a structural unit other than the structural unit containing a group having the azomethine structure represented by the general formula (1) (another structural unit) is not particularly limited.

For example, when a random copolymer is prepared, as a raw material monomer, in addition to a monomer for constituting the structural unit represented by general formula (1), a monomer for constituting the above other structural unit is mixed with a chain transfer agent, a polymerization initiator, and the like, and a polymerization reaction is performed to obtain the desired copolymer. A specific form of the monomer for constituting the other structural unit is as described above.

In an embodiment of the present invention, the photoresponsive polymer is represented by the following general formula (3):

[Chemical formula 26]

General formula (3)

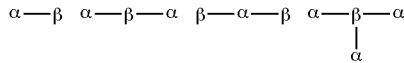

-continued

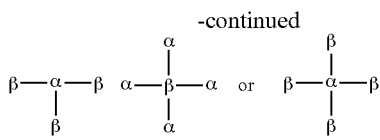

in which

αs each independently represent a polymer block containing a structural unit represented by the general formula (2), and βs each independently represent a polymer block containing a structural unit other than the structural unit represented by the general formula (2). With such an embodiment, the azomethine derivative easily forms a domain in the polymer and can efficiently induce softening/melting, and the polymer has a structural unit other than the structural unit represented by the general formula (2), whereby the polymer having high toughness can be obtained.

By polymerization of the polymer according to an embodiment of the present invention, a portion having an azomethine structure absorbs light, and thermal energy released in a photoexcitation/deactivation process is transmitted to repeating units (structural units) (photothermal conversion) bonded, whereby melting or softening can proceed. In addition, it is considered that by forming a block copolymer, a portion having an azomethine structure easily forms a domain in the polymer, and softening/melting is efficiently induced. Therefore, the effect of the present invention can be obtained still more remarkably.

A specific form of the structural unit constituting the polymer block α and represented by the general formula (2) is as described above.

The structural unit constituting the polymer block β does not contain the azomethine structure ($R_1$—$Z_1$=$Z_2$—$R_2$) in the general formula (1). Specifically, the form described as the structural unit other than the structural unit containing an azomethine structure can be preferably used. In particular, the structural unit preferably has a vinyl-based polymerizable group from a viewpoint of application to synthesis of a block copolymer by a living radical polymerization method such as an ATRP method, an ARGET-ATRP method, or a RAFT method. Specific examples thereof include a styrene derivative, a (meth)acrylic acid derivative, an olefin derivative, a vinyl ester derivative, a vinyl ether derivative, and a vinyl ketone derivative, and a styrene derivative, a (meth)acrylic acid derivative, or an olefin derivative is preferable. That is, in an embodiment of the present invention, in the photoresponsive polymer, the β is a polymer block containing at least one structural unit selected from the group consisting of a styrene derivative, a (meth)acrylic acid derivative, and an olefin derivative. With such an embodiment, a technical effect that a polymer having high toughness can be obtained is exhibited.

The number average molecular weight (sum of number average molecular weights) of the polymer blocks α contained in the polymer represented by general formula (3) is not particularly limited, but is preferably 1000 or more, more preferably 1000 to 100000, still more preferably 1000 to 70000, further still more preferably 1000 to 50000, and particularly preferably 3000 to 50000. When the sum of number average molecular weights of the polymer blocks α is 1000 or more, a toner image having excellent fixability when the polymer is used as a toner can be more easily obtained, which is preferable. When the sum of number average molecular weights of the polymer blocks α is 100000 or less, the efficiency of softening and melting is high, which is preferable. Here, the sum of number average molecular weights of the polymer blocks α refers to the number average molecular weight of a single polymer block α when the polymer represented by general formula (3) contains the single polymer block a, and refers to the sum of the number average molecular weights of a plurality of polymer blocks α when the polymer represented by general formula (3) contains the plurality of polymer blocks α.

The number average molecular weight (sum of number average molecular weights) of the polymer blocks β contained in the polymer represented by the general formula (3) is not particularly limited, but is preferably 1000 or more, more preferably 1100 to 100000, still more preferably 1500 to 70000, further still more preferably 2000 to 50000, and particularly preferably 3000 to 40000. When the sum of number average molecular weights of the polymer blocks § is 1000 or more, a toner image having excellent fixability when the polymer is used as a toner can be more easily obtained, which is preferable. When the sum of number average molecular weights of the polymer blocks pi is 100000 or less, the efficiency of softening and melting is high, which is preferable. Here, the sum of number average molecular weights of the polymer blocks β refers to the number average molecular weight of a single polymer block β when the polymer represented by general formula (3) contains the single polymer block β, and refers to the sum of the number average molecular weights of a plurality of polymer blocks β when the polymer represented by general formula (3) contains the plurality of polymer blocks β.

The total number average molecular weight Mn of the polymer represented by general formula (3) is preferably 3000 or more, more preferably 3200 to 100000, still more preferably 3300 to 70000, further still more preferably 3400 to 50000, and particularly preferably 3450 to 50000. When the total number average molecular weight of the polymer represented by general formula (3) is 3000 or more, a toner image having excellent fixability when the polymer is used as a toner can be more easily obtained, which is preferable. When the total number average molecular weight is 100000 or less, the efficiency of softening and melting is high, which is preferable.

That is, in an embodiment of the present invention, in the photoresponsive polymer, the number average molecular weight of the α is 1000 or more, the number average molecular weight of the β is 1000 or more, and the total number average molecular weight is 3000 or more.

In the polymer represented by general formula (3), a ratio between the sum of number average molecular weights of the polymer blocks α and the sum of number average molecular weights of the polymer blocks β is not particularly limited, but the sum of number average molecular weights of the polymer blocks α:the sum of number average molecular weights of the polymer blocks β is preferably 1:20 to 20:1, and more preferably 1:15 to 15:1 from a viewpoint of ease of softening and melting and image intensity.

The total number average molecular weight of the polymer represented by general formula (3), the sum of number average molecular weights of the polymer blocks α, and the sum of number average molecular weights of the polymer blocks β can be measured by gel permeation chromatography (GPC). Specifically, the number average molecular weight can be measured by a method described in Examples described later.

A method for synthesizing the block copolymer represented by general formula (3) is not particularly limited, and a known method such as anionic polymerization, cationic polymerization, or living radical polymerization can be used. Above all, a living radical polymerization method such as an atom transfer radical polymerization method (ATRP method), an ARGET-ATRP method, or a RAFT method can be suitably used as a simple synthesis method.

For example, in the case of the ATRP method, the synthesis can be performed by using a compound containing a monofunctional, bifunctional, trifunctional, or tetrafunctional halogen element as a starting material, and polymerizing a monomer as a structural unit of the polymer block α or β in the presence of a catalyst.

In the stage of polymerizing a monomer, for example, a monomer that is a structural unit of either the polymer block α or the polymer block β (block that is a core portion of the block copolymer) is polymerized in the presence of an initiator, a catalyst, and a ligand to manufacture a macroinitiator.

Examples of the initiator include butyl 2-bromoisobutyrate, ethyl 2-bromoisobutyrate, ethylenebis(2-bromoisobutyrate), 1,1,1-tris(2-bromoisobutyryloxymethyl) ethane, pentaerythritol tetrakis(2-bromoisobutyrate), α,α'-dibromo-p-xylene, ethyl bromoacetate, 2-bromoisobutyryl bromide, and a mixture thereof, but are not limited thereto.

Examples of the catalyst include a copper(I) catalyst and an iron(II) catalyst, and examples thereof include Cu(I)Cl, Cu(I)Br, Fe(II)Cl, Fe(II)Br, and a mixture thereof.

A known ligand can be used, but one or more selected from the group consisting of 2,2'-bipyridyl, 4,4'-dimethyl-2,2'-bipyridyl, 4,4'-di-tert-butyl-2, 2'-bipyridyl, 1,1,4,7,10, 10-hexamethyltriethylenetetramine, N,N,N',N",N"-pentamethyldiethylenetriamine, cyclam (1,4,8,11-tetraazacyclotetradecane), 1,4,8,11-tetramethyl cyclam (1,4, 8,11-tetramethyl-1,4,8,11-tetraazacyclotetradecane), tris[2-(dimethyl) amino) ethyl] amine, and the like is preferable.

The amounts of the catalyst and the ligand used are not particularly limited and can be appropriately determined with reference to conventionally known findings.

Next, by isolating the macroinitiator obtained by the above polymerization and using the macroinitiator as an initiator, a monomer that is not used in the synthesis of the macroinitiator out of the monomers that are structural units of the polymer blocks α and β is polymerized again in the presence of a catalyst and a ligand. Alternatively, at a stage where almost all the monomers are consumed in the synthesis of the macroinitiator, the monomer not used in the synthesis of the macroinitiator may be added as it is without isolating the macroinitiator, and the polymerization may be continued. Through these operations, the desired block copolymer can be obtained.

Each of the above reactions is preferably performed in an inert atmosphere such as nitrogen or a rare gas including argon. Each of the above reactions can be performed, for example, at a temperature of 25 to 160° C., preferably at a temperature of 35 to 130° C. Each of the above reactions may be performed without using a solvent, or may be performed in a solvent, for example, an organic solvent such as anisole.

Note that the types and amounts of a catalyst and a ligand used, and conditions such as the temperature at the time of the reaction in the reaction of polymerizing a monomer that is a structural unit of either one of the polymer blocks α and R to obtain a macroinitiator may be the same as or different from those in the reaction of reacting the macroinitiator with a monomer that is a structural unit of the other polymer block to obtain a block copolymer.

<Fluidization by Light Irradiation and Reversible Non-Fluidization>

The wavelength of irradiation light when the polymer according to an embodiment of the present invention is fluidized by light irradiation is preferably within a range of 280 nm or more and 480 nm or less, more preferably within a range of 300 nm or more and 420 nm or less, and still more preferably within a range of 330 nm or more and 420 nm or less. Within the above range, a crystal easily collapses (photomeltability is improved), and fixability is enhanced. For fluidization, in addition to light irradiation, heat or pressure may be applied to promote fluidization. By irradiation with irradiation light having the above wavelength, even when heat or pressure is applied, the polymer can be fluidized with less heat or pressure. Therefore, by introducing the polymer according to an embodiment of the present invention into a toner, a toner that can be fixed at the above wavelength, has excellent fixability and image stability, and has high color reproducibility can be obtained.

Note that the above wavelength range includes the wavelength of a part of visible light. Therefore, desirably, the polymer according to an embodiment of the present invention is not fluidized only by receiving sunlight (natural light) or light from a lighting such as a fluorescent lamp, and is fluidized under low cost conditions in which the irradiation amount and irradiation time are suppressed as much as possible. As irradiation conditions of irradiation light when the polymer is fluidized, the irradiation amount is preferably within a range of 0.1 J/cm$^2$ or more and 200 J/cm$^2$ or less, more preferably within a range of 0.1 J/cm$^2$ or more and 100 J/cm$^2$ or less, and still more preferably within a range of 0.1 J/cm$^2$ or more and 50 J/cm$^2$ or less from this viewpoint.

When the polymer is fluidized, the polymer may be heated under light irradiation. As a result, the polymer can be fluidized with a lower irradiation amount. The heating temperature at this time is, for example, within a range of 20° C. or higher and 200° C. or lower, and preferably within a range of 20° C. or higher and 150° C. or lower.

Meanwhile, as the conditions for non-fluidizing (resolidifying) the polymer according to an embodiment of the present invention, the polymer is preferably left at room temperature (within a range of 25±15° C.) (in a natural environment). At this time, the polymer is preferably left in a dark place, but the polymer may be irradiated with natural light or visible light of a fluorescent lamp or the like. The polymer is more preferably heated in a process in which the polymer is non-fluidized. The polymer may also be irradiated with light.

When the polymer is heated to be non-fluidized, the heating temperature is preferably within a range of 0° C. or higher and 200° C. or lower, and more preferably within a range of 20° C. or higher and 150° C. or lower.

[Composition of Toner]

An embodiment of the present invention is a toner containing the polymer according to an embodiment of the present invention. That is, the present invention provides a toner containing the photoresponsive polymer as a binder resin. By introducing the polymer according to an embodiment of the present invention into a toner, it is possible to obtain a toner that can be fixed by light irradiation, has excellent fixability and image stability, and has high color reproducibility. Note that the toner refers to a toner matrix particle or an aggregate of toner particles. The toner particle is preferably a particle obtained by adding an external additive to a toner matrix particle, but the toner matrix particle can also be used as it is as the toner particle. Note that in the present invention, when it is not necessary to distinguish among the toner matrix particle, the toner particle, and the toner, these are also simply referred to as "toner".

The content of the polymer in the toner depends on the azomethine structure ($R_1-Z_1=Z_2-R_2$) in general formula (1) and the type of another structural unit, but is, for example, within a range of 5 to 95% by mass with respect to the total amount of a binder resin, a colorant, a release agent, and the polymer according to an embodiment of the present invention, constituting the toner, from a viewpoint of efficient fluidization and image intensity.

(Other Binder Resin)

The toner according to an embodiment of the present invention may further contain another binder resin. With such an embodiment, the viscosity at the time of fluidization can be adjusted, and image intensity can be enhanced. As the binder resin, another resin not containing a structure derived from an azomethine derivative, that is, a resin not containing the azomethine structure ($R_1-Z_1=Z_2-R_2$) and generally used as a binder resin constituting a toner can be used without limitation. Examples of the binder resin include a styrene resin, an acrylic resin, a styrene acrylic resin, a polyester resin, a silicone resin, an olefin resin, an amide resin, and an epoxy resin. These binder resins can be used singly or in combination of two or more types thereof.

Above all, the binder resin preferably contains at least one selected from the group consisting of a styrene resin, an acrylic resin, a styrene acrylic resin, and a polyester resin, and more preferably contains at least one selected from the group consisting of a styrene acrylic resin and a polyester resin from a viewpoint of reducing viscosity when being melted and having high sharpness meltability. With such an embodiment, image intensity can be enhanced.

(Styrene Acrylic Resin)

The styrene acrylic resin referred to in the present invention is a polymer containing at least a structural unit derived from a styrene monomer and a structural unit derived from a (meth)acrylate monomer. Here, the styrene monomer includes, in addition to styrene represented by a structural formula of $CH_2=CH-C_6H_5$, a monomer having a known side chain or functional group in a styrene structure.

Examples of the styrene monomer include those similar to a styrene monomer that can constitute the above-described polymer.

The (meth)acrylate monomer has a functional group having an ester bond in a side chain. Specific examples thereof include, in addition to an acrylate monomer represented by $CH_2=CHCOOR$ (R is an alkyl group), a vinyl-based ester compound such as a methacrylate monomer represented by $CH_2=C(CH_3)COOR$ (R is an alkyl group). Note that the (meth)acrylate in the (meth)acrylate monomer means an acrylate and a methacrylate.

Examples of the (meth)acrylate monomer include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, and dimethylaminoethyl (meth)acrylate.

The styrene monomers can be used singly or in combination of two or more types thereof, and the (meth)acrylate monomers can be used singly or in combination of two or more types thereof.

The contents of a structural unit derived from the styrene monomer and a structural unit derived from the (meth)acrylate monomer in the styrene acrylic resin are not particularly limited, and can be adjusted appropriately from a viewpoint of controlling the softening point and the glass transition temperature of the binder resin. Specifically, the content of a structural unit derived from the styrene monomer is preferably 40 to 95% by mass, and more preferably 50 to 90% by mass with respect to the total amount of the structural units constituting the styrene acrylic resin. The content of a structural unit derived from the (meth)acrylate monomer is preferably 5 to 60% by mass, and more preferably 10 to 50% by mass with respect to the total amount of the structural units.

The content ratio of the styrene acrylic resin is preferably 5 to 60% by mass, and more preferably 10 to 50% by mass with respect to the total amount of the resins.

The styrene acrylic resin may further contain a structural unit derived from a monomer other than the styrene monomer and the (meth)acrylate monomer as necessary. Examples of the other monomer include a vinyl monomer. Hereinafter, a vinyl monomer that can be used in combination when the styrene-acrylic copolymer referred to in the present invention is formed will be illustrated, but the vinyl monomer that can be used in combination is not limited to those illustrated below.

(1) Olefin

Ethylene, propylene, isobutylene, and the like (2) Vinyl ester

Vinyl propionate, vinyl acetate, vinyl benzoate, and the like (3) Vinyl ether

Vinyl methyl ether, vinyl ethyl ether, and the like (4) Vinyl ketone

Vinyl methyl ketone, vinyl ethyl ketone, vinyl hexyl ketone, and the like (5) N-vinyl compound N-vinylcarbazole, N-vinyl indole, N-vinyl pyrrolidone, and the like.

(6) Others

A vinyl compound such as vinyl naphthalene or vinyl pyridine; and an acrylic acid derivative or a methacrylic acid derivative such as acrylonitrile, methacrylonitrile, or acrylamide.

A resin having a crosslinked structure can also be prepared using a polyfunctional vinyl monomer. Furthermore, a vinyl monomer having an ionic dissociating group in a side chain can also be used. Specific examples of the ionic dissociating group include a carboxyl group, a sulfonic acid group, and a phosphoric acid group. Specific examples of vinyl monomers having these ionic dissociating groups are illustrated below.

Specific examples of the vinyl monomer having a carboxyl group include acrylic acid, methacrylic acid, maleic acid, itaconic acid, cinnamic acid, fumaric acid, a maleic acid monoalkyl ester, and an itaconic acid monoalkyl ester.

When the styrene acrylic resin used in the present invention is formed, the contents of the styrene monomer and the (meth)acrylate monomer are not particularly limited, and can be appropriately adjusted from a viewpoint of controlling the softening point temperature and the glass transition temperature of a binder resin. Specifically, the content of the styrene monomer is preferably 40 to 95% by mass, and more preferably 50 to 90% by mass with respect to the total amount of the monomers constituting the styrene acrylic resin. The content of the (meth)acrylate monomer is preferably 5 to 60% by mass, and more preferably 10 to 50% by mass with respect to the total amount of the monomers constituting the styrene acrylic resin.

A method for forming the styrene acrylic resin is not particularly limited, and examples thereof include a method for polymerizing a monomer using a known oil-soluble or water-soluble polymerization initiator. For example, a known chain transfer agent such as n-octyl mercaptan may be used as necessary. Examples of the oil-soluble polymerization initiator include the following azo-based or diazo-based polymerization initiator and peroxide-based polymerization initiator.

Examples of the azo-based or diazo-based polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

Examples of the peroxide-based polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl) propane, and tris-(t-butylperoxy) triazine.

When styrene acrylic resin particles are formed by an emulsion polymerization method, a water-soluble radical polymerization initiator can be used. Example of the water-soluble radical polymerization initiator include a persulfate such as potassium persulfate or ammonium persulfate, azobisaminodipropane acetate, azobiscyanovaleric acid and a salt thereof, and hydrogen peroxide.

Polymerization temperature varies depending on the types of monomer and polymerization initiator used, but is preferably 50 to 100° C., and more preferably 55 to 90° C. Polymerization time varies depending on the types of monomer and polymerization initiator used, but is preferably 2 to 12 hours, for example.

The styrene acrylic resin particles formed by an emulsion polymerization method can have two or more layers made of resins having different compositions. As a manufacturing method in this case, a multi-stage polymerization method for adding a polymerization initiator and a polymerizable monomer to a dispersion of resin particles prepared by an emulsion polymerization process (first stage polymerization) according to a conventional method, and subjecting this system to a polymerization process (second stage and third stage polymerization) can be adopted.

(Polyester Resin)

The polyester resin is a polyester resin obtained by a polycondensation reaction between a di- or higher valent carboxylic acid (polyvalent carboxylic acid component) and a di- or higher hydric alcohol (polyhydric alcohol component). Note that the polyester resin may be amorphous or crystalline.

The valence of each of the polyvalent carboxylic acid component and the polyhydric alcohol component is preferably 2 or 3, and more preferably 2. That is, the polyvalent carboxylic acid component preferably contains a dicarboxylic acid component, and the polyhydric alcohol component preferably contains a diol component.

Examples of the dicarboxylic acid component include: a saturated aliphatic dicarboxylic acid such as oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid (dodecanedioic acid), 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, or 1,18-octadecanedicarboxylic acid; an unsaturated aliphatic dicarboxylic acid such as methylene succinic acid, fumaric acid, maleic acid, 3-hexendiodic acid, 3-octenedioic acid, or dodecenyl succinic acid; an unsaturated aromatic dicarboxylic acid such as phthalic acid, terephthalic acid, isophthalic acid, t-butyl isophthalic acid, tetrachlorophthalic acid, chlorophthalic acid, nitrophthalic acid, p-phenylenediacetic acid, 2,6-naphthalene dicarboxylic acid, 4,4'-biphenyldicarboxylic acid, or anthracenedicarboxylic acid; lower alkyl esters thereof; and acid anhydrides thereof. The dicarboxylic acid component may be used singly or in mixture of two or more types thereof.

In addition, for example, a tri- or higher valent polyvalent carboxylic acid such as trimellitic acid or pyromellitic acid, an anhydride thereof, and an alkyl ester thereof having 1 to 3 carbon atoms can be used.

Examples of the diol component include: a saturated aliphatic diol such as ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,20-eicosandiol, or neopentyl glycol; an unsaturated aliphatic diol such as 2-butene-1,4-diol, 3-butene-1,4-diol, 2-butyne-1,4-diol, 3-butyne-1,4-diol, or 9-octadecene-7,12-diol; and an aromatic diol such as a bisphenol including bisphenol A and bisphenol F, or an alkylene oxide adduct of a bisphenol including an ethylene oxide adduct thereof and a propylene oxide adduct thereof. Derivatives thereof can also be used. The diol component may be used singly or in mixture of two or more types thereof.

A method for manufacturing the polyester resin is not particularly limited, and the polyester resin can be manufactured by polycondensing (esterifying) the polyvalent carboxylic acid component and the polyhydric alcohol component using a known esterification catalyst.

Examples of a catalyst that can be used for manufacturing the polyester resin include: an alkali metal compound of sodium or lithium; a compound containing a group 2 element such as magnesium or calcium; a compound of a metal such as aluminum, zinc, manganese, antimony, titanium, tin, zirconium, or germanium; a phosphorous acid compound; a phosphoric acid compound, and an amine compound. Specific examples of the tin compound include dibutyltin oxide, tin octylate, tin dioctylate, and salts thereof. Examples of the titanium compound include: a titanium alkoxide such as tetranormal butyl titanate (Ti(O-n-Bu)$_4$), tetraisopropyl titanate, tetramethyl titanate, or tetrastearyl titanate; a titanium acylate such as polyhydroxytitanium stearate; and a titanium chelate such as titanium tetraacetylacetate, titanium lactate, or titanium triethanol aminate. Examples of the germanium compound include germanium dioxide. Examples of the aluminum compound include polyaluminum hydroxide, aluminum alkoxide, and tributylaluminate. These compounds may be used singly or in combination of two or more types thereof.

The polymerization temperature is not particularly limited, but is preferably 70 to 250° C. The polymerization time is not particularly limited, but is preferably 0.5 to 10 hours. During polymerization, the pressure inside the reaction system may be reduced as necessary.

The content ratio of the polyester resin is preferably 5 to 60% by mass, and more preferably 10 to 50% by mass with respect to the total amount of the resins.

The glass transition temperature (Tg) of the toner is preferably 25 to 100° C., and more preferably 30 to 80° C. from a viewpoint of fixability, heat resistant storage stability, and the like. The glass transition temperature (Tg) of the toner can be adjusted by the molecular weight of the polymer, the type and content of a structural unit other than the structural unit of general formula (1) when the toner contains the structural unit other than the structural unit of general formula (1). When the toner contains a binder resin, the glass transition temperature (Tg) of the toner can be further adjusted by the content ratio between the polymer and the binder resin, the type and molecular weight of the binder resin, and the like.

Note that the toner according to an embodiment of the present invention may be particles having a single layer structure or particles having a core-shell structure. The type of a binder resin used for a core particle and a shell portion of the core-shell structure is not particularly limited.

<Colorant>

The toner according to an embodiment of the present invention may further contain a colorant. Since the polymer according to an embodiment of the present invention is not significantly colored, a toner having high color reproducibility of a colorant can be obtained. As the colorant, a generally known dye and pigment can be used.

Examples of a colorant for obtaining a black toner include carbon black, a magnetic material, and iron-titanium composite oxide black. Examples of the carbon black include channel black, furnace black, acetylene black, thermal black, and lamp black. Examples of the magnetic material include ferrite and magnetite.

Examples of a colorant for obtaining a yellow toner include: dyes such as C.I. Solvent Yellow 19, C.I. Solvent Yellow 44, C.I. Solvent Yellow 77, C.I. Solvent Yellow 79, C.I. Solvent Yellow 81, C.I. Solvent Yellow 82, C.I. Solvent Yellow 93, C.I. Solvent Yellow 98, C.I. Solvent Yellow 103, C.I. Solvent Yellow 104, C.I. Solvent Yellow 112, and C.I. Solvent Yellow 162; and pigments such as C.I. Pigment yellow 14, C.I. Pigment yellow 17, C.I. Pigment yellow 74, C.I. Pigment yellow 93, C.I. Pigment yellow 94, C.I. Pigment yellow 138, C.I. Pigment yellow 155, C.I. Pigment yellow 180, and C.I. Pigment yellow 185.

Examples of a colorant for obtaining a magenta toner include: dyes such as C.I. Solvent Red 1, C.I. Solvent Red 49, C.I. Solvent Red 52, C.I. Solvent Red 58, C.I. Solvent Red 63, C.I. Solvent Red 111, and C.I. Solvent Red 122; and pigments such as C.I. Pigment Red 5, C.I. Pigment Red 48:1, C.I. Pigment Red 53:1, C.I. Pigment Red 57:1, C.I. Pigment Red 122, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Examples of a colorant for obtaining a cyan toner include: dyes such as C.I. Solvent Blue 25, C.I. Solvent Blue 36, C.I. Solvent Blue 60, C.I. Solvent Blue 70, C.I. Solvent Blue 93, and C.I. Solvent Blue 95; and pigments such as C.I. Pigment Blue 1, C.I. Pigment Blue 7, C.I. Pigment Blue 15, C.I. Pigment Blue 15:3, C.I. Pigment Blue 60, C.I. Pigment Blue 62, C.I. Pigment Blue 66, and C.I. Pigment Blue 76.

Colorants for obtaining toners of colors can be used singly or in combination of two or more types thereof for each of the colors.

The content of the colorant is preferably 0.5 to 20% by mass, and more preferably 2 to 10% by mass in the toner particles (toner matrix particles) before addition of an external additive.

<Release Agent>

The toner according to an embodiment of the present invention may further contain a release agent. By introducing the release agent into the toner, a toner having better fixability and high color reproducibility can be obtained when the toner is thermally fixed under light irradiation.

The release agent used is not particularly limited, and various known waxes can be used. Examples of the wax include a polyolefin such as low molecular weight polypropylene, polyethylene, or oxidized low molecular weight polypropylene, a paraffin wax, and a synthetic ester wax. Above all, a paraffin wax is preferably used from a viewpoint of improving storage stability of the toner.

The content of the release agent in the toner matrix particles is preferably 1 to 30% by mass, and more preferably 3 to 15% by mass.

<Charge Control Agent>

The toner according to an embodiment of the present invention may contain a charge control agent. The charge control agent used is not particularly limited as long as being able to provide a positive or negative charge by frictional charging and being colorless, and various known positively chargeable charge control agents and negatively chargeable charge control agents can be used.

The content of the charge control agent in the toner matrix particles is preferably 0.01 to 30% by mass, and more preferably 0.1 to 10% by mass.

<External Additive>

In order to improve the fluidity, chargeability, cleanability, and the like of the toner, an external additive such as a fluidizing agent, which is a so-called post-treatment agent, or a cleaning aid may be added to the toner matrix particles to obtain the toner according to an embodiment of the present invention.

Examples of the external additive include inorganic particles such as inorganic oxide particles including silica particles, alumina particles, and titanium oxide particles, inorganic stearic acid compound particles including aluminum stearate particles and zinc stearate particles, or inorganic titanic acid compound particles including strontium titanate particles and zinc titanate particles. These inorganic particles may be hydrophobized as necessary. These particles can be used singly or in combination of two or more types thereof.

Among these particles, as the external additive, for example, sol-gel silica particles, silica particles whose surfaces have been hydrophobized (hydrophobic silica particles), and titanium oxide particles (hydrophobic titanium oxide particles) are preferable.

The external additive has a number average primary particle size preferably within a range of 1 to 200 nm, more preferably within a range of 10 to 180 nm. When two or more types of external additives are used in combination, at least one of the external additives particularly preferably has a number average primary particle size of 30 nm or more and 180 nm or less.

The addition amount of the external additive in the toner is preferably 0.05 to 5% by mass, and more preferably 0.1 to 3% by mass.

In an embodiment of the present invention, the addition amount of the external additive is preferably 0.05 to 5% by mass, and more preferably 0.1 to 3% by mass with respect to the amount of the toner matrix particles.

<Average Particle Size of Toner>

The average particle size of the toner (and average particle size of toner matrix particles) is preferably 4 to 20 μm, and more preferably 5 to 15 μm in terms of volume-based median diameter (D50). When the volume-based median diameter (D50) is within the above range, transfer efficiency is increased, image quality of halftone is improved, and image quality of a thin line, a dot, or the like is improved.

The volume-based median diameter (D50) can be measured and calculated using a measuring device in which a computer system (manufactured by Beckman Coulter, Inc.) having data processing software "Software V 3.51" mounted thereon is connected to "Coulter Counter 3" (manufactured by Beckman Coulter, Inc.).

Specifically, 0.02 g of a measurement sample (toner or toner matrix particles) is added to 20 mL of a surfactant solution (for the purpose of dispersing the toner particles, for example, a surfactant solution obtained by diluting a neutral detergent containing a surfactant component 10 times with pure water) and familiarized. Thereafter, the resulting solution is subjected to ultrasonic dispersion for one minute to prepare a dispersion. This dispersion is injected into a beaker containing "ISOTON II" (manufactured by Beckman Coulter, Inc.) in a sample stand with a pipette until a display concentration of the measuring device reaches 8%.

Here, by setting the display concentration within the above range, a reproducible measured value can be obtained. Then, in the measuring device, the count number of measurement particles is set to 25000, an aperture diameter is set to 50 μm, a measurement range of 1 to 30 μm is divided into 256 parts, and a frequency value is calculated. A particle size of 50% from a larger volume integration fraction is taken as the volume-based median diameter (D50).

[Method for Manufacturing Toner]

A method for manufacturing the toner according to an embodiment of the present invention is not particularly limited. For example, when a toner containing only the polymer according to an embodiment of the present invention is manufactured, a manufacturing method including: crushing the polymer using a device such as a hammer mill, a feather mill, or a counter jet mill; and then performing classification using a dry classifier such as a spin air sieve, a Classiel, or a micron classifier so as to obtain a desired particle size can be used. When a toner further containing a colorant is manufactured, the polymer according to an embodiment of the present invention and the colorant are dissolved in a solvent in which both the polymer and the colorant can be dissolved to form a solution, then the solvent is removed, and then crushing and classification can be performed by a method similar to the above method.

In particular, a toner containing the polymer according to an embodiment of the present invention, and as necessary, a binder resin and a colorant is preferably manufactured by a manufacturing method using an emulsion aggregation method that can easily control the particle size and the shape.

Such a manufacturing method preferably includes:

(1A) a binder resin particle dispersion preparation step of preparing a dispersion of binder resin particles as necessary;

(1B) a polymer particle dispersion preparation step of preparing a dispersion of particles of the polymer according to an embodiment of the present invention;

(1C) a colorant particle dispersion preparation step of preparing a dispersion of colorant particles as necessary;

(2) an association step of adding a flocculant to an aqueous medium in which polymer particles, and as necessary, binder resin particles and colorant particles are present to promote salting out, and simultaneously aggregating and fusing the particles to form associated particles;

(3) an aging step of controlling the shapes of the associated particles to form toner matrix particles;

(4) a filtering and washing step of filtering and separating the toner matrix particles from the aqueous medium and removing a surfactant and the like from the toner matrix particles;

(5) a drying step of drying the washed toner matrix particles; and (6) an external additive addition step of adding an external additive to the dried toner matrix particles.

Steps (1A) to (1C) will be described below.

(1A) Binder Resin Particle Dispersion Preparation Step

In this step, resin particles are formed by conventionally known emulsion polymerization or the like, and the resin particles are aggregated and fused to form binder resin particles. For example, a polymerizable monomer constituting a binder resin is put into an aqueous medium and dispersed therein, and the polymerizable monomer is polymerized by a polymerization initiator to prepare a dispersion of binder resin particles.

As the method for obtaining the binder resin particle dispersion, in addition to the method for polymerizing a polymerizable monomer by a polymerization initiator in an aqueous medium, for example, a method for performing a dispersion treatment in an aqueous medium without using a solvent, or a method for dissolving a crystalline resin in a solvent such as ethyl acetate to form a solution, emulsifying and dispersing the solution in an aqueous medium using a disperser, and then removing the solvent may be used.

At this time, the binder resin may contain a release agent in advance as necessary. For the purpose of dispersion, polymerization is preferably performed appropriately in the presence of a known surfactant (for example, an anionic surfactant such as polyoxyethylene (2) sodium dodecyl ether sulfate, sodium dodecyl sulfate, or dodecyl benzene sulfonic acid).

The volume-based median diameter of the binder resin particles in the dispersion is preferably 50 to 300 nm. The volume-based median size of the binder resin particles in the dispersion can be measured by a dynamic light scattering method using "Microtrack UPA-150" (manufactured by Nikkiso Co., Ltd.).

(1B) Polymer Particle Dispersion Preparation Step

This polymer particle dispersion preparation step is a step of dispersing the polymer according to an embodiment of the present invention in a form of fine particles in an aqueous medium to prepare a dispersion of particles of the polymer.

In preparing a dispersion of particles of the polymer, first, an emulsion of the polymer is prepared. The emulsion of the polymer can be obtained, for example, by dissolving the polymer in an organic solvent and then emulsifying the obtained solution in an aqueous medium.

A method for dissolving the polymer in an organic solvent is not particularly limited, and examples thereof include a method for adding the polymer to an organic solvent and stirring and mixing the resulting mixture such that the polymer is dissolved therein. The addition amount of the polymer is preferably 5 parts by mass or more and 100 parts by mass or less, and more preferably 10 parts by mass or more and 50 parts by mass or less with respect to 100 parts by mass of the organic solvent.

Next, the obtained solution of the polymer and an aqueous medium are mixed and stirred using a known disperser such as a homogenizer. As a result, the polymer becomes droplets and is emulsified in the aqueous medium to prepare an emulsion of the polymer.

The addition amount of the solution of the polymer is preferably 10 parts by mass or more and 110 parts by mass or less with respect to 100 parts by mass of the aqueous medium.

The temperature of each of the solution of the polymer and the aqueous medium at the time of mixing the solution of the polymer and the aqueous medium is within a temperature range of lower than the boiling point of the organic solvent, preferably 20° C. or higher and 80° C. or lower, and more preferably 30° C. or higher and 75° C. or lower. The temperature of the solution of the polymer and the temperature of the aqueous medium at the time of mixing the solution of the polymer and the aqueous medium may be the same as or different from each other, and are preferably the same as each other.

As stirring conditions of the disperser, for example, in a case where the volume of a stirring container is 1 to 3 L, the number of rotations is preferably 7000 rpm or more and 20000 rpm or less, and stirring time is preferably 10 minutes or more and 30 minutes or less.

The dispersion of particles of the polymer is prepared by removing the organic solvent from the emulsion of the polymer. The organic solvent is removed from the emulsion of the polymer by a known method such as, air blowing, heating, pressure reduction, or a combination thereof.

As an example, the organic solvent is removed, for example, by heating the emulsion of the polymer in an atmosphere of an inert gas such as nitrogen preferably at 25° C. or higher and 90° C. or lower, more preferably at 30° C. or higher and 80° C. or lower until about 80% by mass or more and 95% by mass or less of the initial amount of the organic solvent is removed (for example, for 20 to 150 minutes). As a result, the organic solvent is removed from the aqueous medium to prepare a dispersion of particles of the polymer in which particles of the polymer are dispersed in the aqueous medium.

The mass average particle size of particles of the polymer in the dispersion of particles of the polymer is preferably 90 nm or more and 1200 nm or less. The mass average particle size can be set within the above range by appropriately adjusting the viscosity when the polymer is blended with an organic solvent, the blending ratio between the solution of the polymer and the aqueous medium, the stirring speed of a disperser when the emulsion of the polymer is prepared, and the like. The mass average particle size of particles of the polymer in the dispersion of particles of the polymer can be measured using Microtrack UPA-150 (manufactured by Nikkiso Co., Ltd.) or an electrophoretic light scattering photometer "ELS-800" (manufactured by Otsuka Electronics Co., Ltd.).

<Organic Solvent>

The organic solvent used in this step can be used without particular limitation as long as the polymer can be dissolved in the organic solvent. Specific examples of the organic solvent include: an ester such as ethyl acetate or butyl acetate; an ether such as diethyl ether, diisopropyl ether, or tetrahydrofuran; a ketone such as acetone or methyl ethyl ketone; a saturated hydrocarbon such as hexane or heptane; and a halogenated hydrocarbon such as dichloromethane, dichloroethane, or carbon tetrachloride.

These organic solvents can be used singly or in mixture of two or more types thereof. Among these organic solvents, a ketone and a halogenated hydrocarbon are preferable, and methyl ethyl ketone and dichloromethane are more preferable.

<Aqueous Medium>

Examples of the aqueous medium used in this step include water and an aqueous medium mainly containing water and optionally containing a water-soluble solvent such as an alcohol or a glycol, a surfactant, a dispersant, or the like. The aqueous medium is preferably a mixture of water and a surfactant.

Examples of the surfactant include a cationic surfactant, an anionic surfactant, and a nonionic surfactant. Examples of the cationic surfactant include dodecyl ammonium chloride, dodecyl ammonium bromide, dodecyl trimethyl ammonium bromide, dodecyl pyridinium chloride, dodecyl pyridinium bromide, and hexadecyl trimethyl ammonium bromide. Examples of the anionic surfactant include a fatty acid soap such as sodium stearate or sodium dodecanoate, sodium dodecylbenzene sulfonate, and sodium dodecyl sulfate. Examples of the nonionic surfactant include polyoxyethylene dodecyl ether, polyoxyethylene hexadecyl ether, polyoxyethylene nonyl phenyl ether, polyoxyethylene dodecyl ether, polyoxyethylene sorbitan monooleate ether, and monodecanoyl sucrose.

These surfactants can be used singly or in combination of two or more types thereof. Among the surfactants, an anionic surfactant is preferably used, and sodium dodecylbenzene sulfonate is more preferably used.

The addition amount of the surfactant is preferably 0.01 parts by mass or more and 10 parts by mass or less, and more preferably 0.04 parts by mass or more and 1 part by mass or less in terms of solid content with respect to 100 parts by mass of the aqueous medium.

(1C) Colorant Particle Dispersion Preparation Step

This colorant particle dispersion preparation step is a step of dispersing a colorant in a form of fine particles in an aqueous medium to prepare a dispersion of colorant particles.

The colorant can be dispersed using mechanical energy. The number-based median diameter of the colorant particles in the dispersion is preferably 10 to 300 nm, and more preferably 50 to 200 nm. The number-based median size of the colorant particles can be measured using an electrophoretic light scattering photometer "ELS-800" (manufactured by Otsuka Electronics Co., Ltd.).

The steps of association step (2) to external additive addition step (6) can be performed according to conventionally known various methods.

Note that the flocculant used in association step (2) is not particularly limited, but is suitably selected from metal salts. Examples of the metal salts include: a monovalent metal salt such as a salt of an alkali metal such as sodium, potassium, or lithium; a divalent metal salt of calcium, magnesium, manganese, or copper; and a trivalent metal salt of iron or aluminum. Specific examples of the metal salts include sodium chloride, potassium chloride, lithium chloride, calcium chloride, magnesium chloride, zinc chloride, copper sulfate, magnesium sulfate, and manganese sulfate. Above all, a divalent metal salt is particularly preferably used because of being able to promote aggregation in a smaller amount. These metal salts can be used singly or in combination of two or more types thereof.

[Developer]

For example, the toner according to an embodiment of the present invention may be used as a one-component magnetic toner containing a magnetic material, may be used as a two-component developer mixed with a so-called carrier, or may be used singly as a non-magnetic toner, any of which can be suitably used.

Examples of the magnetic material include magnetite, γ-hematite, and various ferrites.

Examples of the carrier contained in the two-component developer include magnetic particles made of a conventionally known material such as a metal including iron, steel, nickel, cobalt, ferrite, and magnetite, or alloys of those metals with a metal such as aluminum or lead.

The carrier may be a coated carrier obtained by coating surfaces of magnetic particles with a coating agent such as a resin, or may be a resin dispersion type carrier obtained by dispersing magnetic material powder in a binder resin. The coating resin is not particularly limited, but examples thereof include an olefin resin, an acrylic resin, a styrene resin, a styrene acrylic resin, a silicone resin, a polyester resin, and a fluorocarbon resin. A resin for constituting the resin dispersion type carrier particles is not particularly limited, and a known resin can be used. Examples thereof include an acrylic resin, a styrene acrylic resin, a polyester resin, a fluorocarbon resin, and a phenol resin.

The volume-based median diameter of the carrier is preferably 20 to 100 μm, and more preferably 25 to 80 μm. The volume-based median size of the carrier can be typically measured with a laser diffraction type particle size distribution measuring device "HELOS" (manufactured by SYMPATEC Gmbh) equipped with a wet type disperser.

The mixing amount of the toner with respect to the carrier is preferably 2 to 10% by mass with respect to 100% by mass of the total mass of the toner and the carrier.

[Image Forming Method]

The toner according to an embodiment of the present invention can be used in various known electrophotographic image forming methods. For example, the toner can be used in a monochrome image forming method or a full color image forming method. In the full color image forming method, the toner according to an embodiment of the present invention can be applied to any image forming method such as a 4-cycle image forming method including four types of color developing devices for yellow, magenta, cyan, and black and one photoreceptor, or a tandem type image forming method in which an image forming unit including a color developing device for each color and a photoreceptor is mounted for each color.

That is, an image forming method according to an embodiment of the present invention includes 1) a step of forming a toner image made of the toner according to an embodiment of the present invention on a recording medium, and 2) irradiating the toner image with light to soften the toner image. Such an embodiment provides excellent fixability and higher image quality.

Regarding Step 1)

In this step, a toner image containing the toner according to an embodiment of the present invention is formed on a recording medium.

(Recording Medium)

The recording medium is a member for holding a toner image. Examples of the recording medium include coated printing paper such as plain paper, high quality paper, art paper, or coated paper, commercially available Japanese paper or postcard paper, a resin film for OHP or a packaging material, and cloth.

The recording medium may have a sheet shape with a predetermined size, or may have a long shape to be wound into a roll after a toner image is fixed onto the recording medium.

For example, by transferring a toner image on a photoreceptor onto a recording medium, the toner image can be formed as described later.

Regarding Step 2)

In this step, the formed toner image is irradiated with light to soften the toner image. As a result, the toner image can be bonded onto the recording medium.

The wavelength of the irradiation light is not particularly limited as long as being able to sufficiently soften a toner image by photothermal conversion or the like by the polymer in the toner, but is preferably 280 nm or more and 480 nm or less. Within the above range, the toner image can be softened more efficiently. The light irradiation amount is preferably 0.1 to 200 J/cm$^2$, more preferably 0.1 to 100 J/cm$^2$, and still more preferably 0.1 to 50 J/cm$^2$ from a similar viewpoint.

Light irradiation can be performed using a light source such as a light emitting diode (LED) or a laser light source as described later. In addition, as described later, heating may be further performed in addition to light irradiation.

After step 2), as necessary, 3) a step of pressurizing the softened toner image may be further performed. Such an embodiment enhances the fixability.

Regarding Step 3)

In this step, the softened toner image is pressurized.

A pressure for pressurizing the toner image on the recording medium is not particularly limited, but is preferably 0.01 to 5.0 MPa, and more preferably 0.05 to 1.0 MPa. By setting the pressure to 0.01 MPa or more, the deformation amount of the toner image can be increased. Therefore, the contact area between the toner image and a recording sheet S increases, and the fixability of an image is further enhanced easily. In addition, by setting the pressure to 5.0 MPa or less, shock noise during pressurization can be suppressed.

The pressurization step may be performed before or simultaneously with the step of irradiating a toner image with light to soften the toner image (step 2) described above). However, the pressurization step is preferably performed after light irradiation because a toner image in a softened state in advance can be pressurized and as a result, the fixability of an image is further enhanced.

In the pressurization step, the softened toner image may be further heated. That is, the pressurization step may be performed while the toner image is heated. The temperature at that time (for example, the temperature of a pressurizing member) is preferably 15° C. or higher, more preferably 20° C. or higher, still more preferably higher than 20° C., further still more preferably 30° C. or higher, and further still more preferably 40° C. or higher. Such an embodiment remarkably enhances the fixability. The upper limit is not particularly limited, but is, for example, 200° C. or lower, 150° C. or lower, or 100° C. or lower.

The heating temperature of a toner image (surface temperature of a toner image at the time of heating) is preferably (Tg+20) to (Tg+100°) C, and more preferably (Tg+25) to (Tg+80°) C when Tg represents the glass transition temperature of the toner. If the surface temperature of the toner image is (Tg+20°) C or higher, the toner image is easily deformed by pressurization. If the surface temperature is (Tg+100°) C or lower, hot offset is easily suppressed. Note that the hot offset refers to a phenomenon that a part of the toner is transferred to a pressurizing member such as a roller in the fixing step, and a toner layer is divided.

Before step 2), step 4) of preheating the toner image may be performed as necessary. By further performing step 4) of preheating the toner image before step 2) in this manner, sensitivity of the polymer according to an embodiment of the present invention to light can be further enhanced. As a result, even in a case of the high molecular weight compound, the sensitivity to light is less likely to be impaired.

Therefore, melting or softening of the toner image by light irradiation is easily promoted.

The image forming method according to an embodiment of the present invention can be performed, for example, by using the following image forming apparatus.

FIG. 1 is a schematic configuration diagram illustrating an image forming apparatus 100 used in an image forming method according to an embodiment of the present invention. However, the image forming apparatus used in the present invention is not limited to the following forms and illustrated examples. FIG. 1 illustrates an example of the monochrome image forming apparatus 100, but the present invention can also be applied to a color image forming apparatus.

The image forming apparatus 100 is an apparatus that forms an image on a recording sheet S as a recording medium, includes an image reader 71 and an automatic document feeder 72, and forms an image on the recording sheet S conveyed by a sheet conveyance system 7 with an image forming unit 10, an irradiation unit 40, and a pressure bonding unit 9.

The image forming apparatus 100 uses the recording sheet S as a recording medium. However, the medium on which an image is formed may be other than a sheet.

A document d placed on a document table of the automatic document feeder 72 is scanned and exposed by an optical system of a scanning exposure device of the image reader 71, and read by an image sensor CCD. An analog signal photoelectrically converted by the image sensor CCD is subjected to analog processing, A/D conversion, shading correction, image compression processing, and the like in the image processor 20 and then input to an exposure unit 3 of the image forming unit 10.

The sheet conveyance system 7 includes a plurality of trays 16, a plurality of sheet feeders 11, a conveyance roller 12, a conveyance belt 13, and the like. The trays 16 store recording sheets S having determined sizes, respectively, operate the sheet feeders 11 of the trays 16 determined according to an instruction from a control unit 90, and supply the recording sheets S. The conveyance roller 12 conveys the recording sheet S fed from each of the trays 16 by each of the sheet feeders 11 or the recording sheet S carried from a manual sheet feeder 15 to the image forming unit 10.

In the image forming unit 10, a charger 2, the exposure unit 3, a developing unit 4, a transfer unit 5, and a cleaner 8 are disposed in this order around the photoreceptor 1 in a rotational direction of the photoreceptor 1.

The photoreceptor 1, which is an image carrier, is an image carrier on a surface of which a photoconductive layer is formed, and is rotatable in an arrow direction in FIG. 1 by a driving device (not illustrated). Around the photoreceptor 1, a temperature and humidity meter 17 that detects a temperature and a humidity in the image forming apparatus 100 is disposed.

The charger 2 uniformly charges a surface of the photoreceptor 1 to uniformly charge the surface of the photoreceptor 1. The exposure unit 3 includes a beam emitting light source such as a laser diode, and irradiates the surface of the charged photoreceptor 1 with beam light to dissipate charges of a portion irradiated with the beam light, and forms an electrostatic latent image according to image data on the photoreceptor 1. The developing unit 4 supplies a toner contained therein to the photoreceptor 1 to form a toner image based on the electrostatic latent image on the surface of the photoreceptor 1.

The transfer unit 5 is disposed so as to face the photoreceptor 1 via the recording sheet S, and transfers a toner image onto the recording sheet S. The cleaner 8 includes a blade 85. The blade 85 cleans the surface of the photoreceptor 1 to remove the developer remaining on the surface of the photoreceptor 1.

The recording sheet S onto which the toner image has been transferred is conveyed to the pressure bonding unit 9 by the conveyance belt 13. The pressure bonding unit 9 is arbitrarily disposed, and applies only pressure or heat and pressure to the recording sheet S onto which the toner image has been transferred by pressurizing members 91 and 92 to perform a fixing treatment, and thereby fixes an image onto the recording sheet S. The recording sheet S onto which the image has been fixed is conveyed to a sheet discharger 14 by a conveyance roller and discharged through the sheet discharger 14 to the outside of the apparatus.

In addition, the image forming apparatus 100 includes a sheet reversing unit 24, and can convey the thermally fixed recording sheet S to the sheet reversing unit 24 before the sheet discharger 14, can turn the recording sheet S upside down, and can discharge the recording sheet S, or can convey the recording sheet S that has been turned upside down to the image forming unit 10 again and can form images on both sides of the recording sheet S.

<Irradiation Unit>

Figure 2:
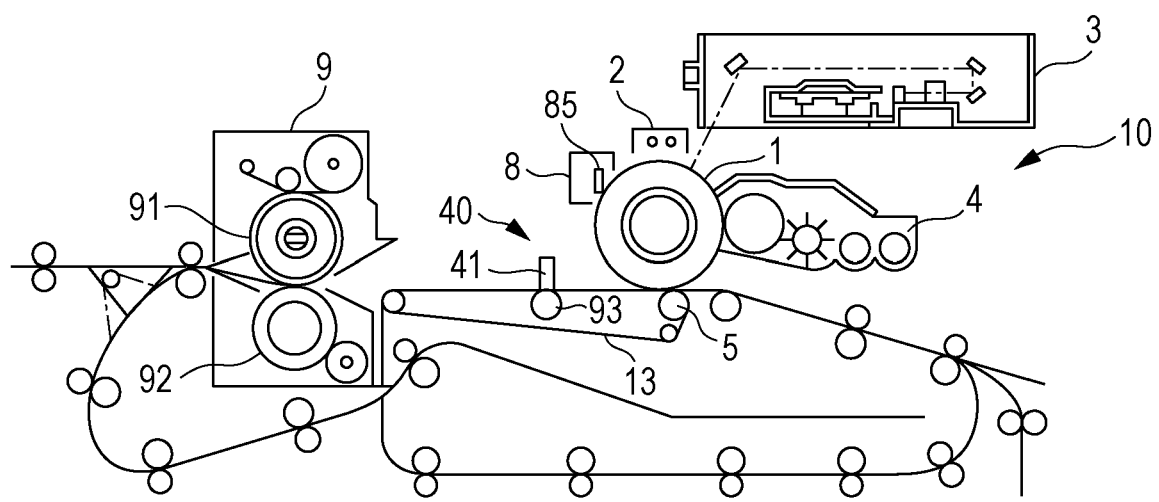
FIG. 2 is a schematic configuration diagram of an irradiation unit in the image forming apparatus.

FIG. 2 is a schematic configuration diagram of the irradiation unit 40 in the image forming apparatus 100.

The image forming apparatus 100 according to an embodiment of the present invention includes the irradiation unit 40. The irradiation unit 40 includes a light source 41 and a heating member 93. Examples of a device constituting the light source 41 include a light emitting diode (LED) and a laser light source.

The light source 41 irradiates a toner image formed on a recording medium with light to soften the toner image. Conditions of light irradiation are not particularly limited as long as the polymer according to an embodiment of the present invention contained in a toner of a developer is melted and fluidized. The wavelength of light with which the toner image is irradiated may be any wavelength as long as the polymer can be fluidized sufficiently, and is preferably within a range of 280 nm or more and 480 nm or less, more preferably within a range of 300 nm or more and 420 nm or less, and still more preferably within a range of 330 nm or more and 420 nm or less. The light irradiation amount in the light source 41 may be any amount as long as the polymer can be fluidized sufficiently, and is for example, within a range of 0.1 J/cm$^2$ or more and 200 J/cm$^2$ or less, preferably within a range of 0.1 J/cm$^2$ or more and 100 J/cm$^2$ or less, and more preferably within a range of 0.1 J/cm$^2$ or more and 50 J/cm$^2$ or less.

When the toner image is irradiated with light by the light source 41 to soften the toner image, the toner image may be heated by the heating member 93 under light irradiation. As a result, the softening and melting of the toner image can proceed more efficiently. The heating temperature at this time is, for example, within a range of 20° C. or higher and 200° C. or lower, and preferably within a range of 20° C. or higher and 150° C. or lower.

By leaving the softened toner image at room temperature (within a range of 25±15° C.), heating the toner image, or irradiating the toner image with visible light, the toner image can be solidified and fixed onto a recording medium. Note that as will be described later, the fixing step preferably further includes a step of pressurizing the softened toner image. In the pressurization step, the softened toner image is preferably further heated.

The light source 41 emits light toward a first surface of a recording sheet S holding a toner image on a photoreceptor side, and is disposed on the photoreceptor side with respect to the recording sheet S surface nipped by the photoreceptor 1 and a transfer roller 5 which is the transfer unit. The heating member 93 is disposed on the side opposite to the light source 41 with respect to the recording sheet S surface. The light source 41 and the heating member 93 are disposed in a conveyance direction (sheet conveyance direction) of the recording sheet S.

The light source 41 and the heating member 93 are disposed on a downstream side in the sheet conveyance direction with respect to the nip position by the photoreceptor 1 and the transfer roller 5 and on an upstream side in the sheet conveyance direction with respect to the pressure bonding unit 9.

By the image forming method according to an embodiment of the present invention, a uniform potential is applied to the photoreceptor 1 by the charger 2 to charge the photoreceptor 1. Thereafter, the photoreceptor 1 is scanned with a light flux emitted by the exposure unit 3 based on original image data to form an electrostatic latent image. Next, a developer containing a toner containing the polymer according to an embodiment of the present invention is supplied onto the photoreceptor 1 by the developing unit 4.

When the recording sheet S is conveyed from the tray 16 to the image forming unit 10 in synchronization with the timing when a toner image carried on a surface of the photoreceptor 1 reaches the position of the transfer roller 5 which is the transfer unit by rotation of the photoreceptor 1, the toner image on the photoreceptor 1 is transferred onto the recording sheet S nipped by the transfer roller 5 and the photoreceptor 1 by a transfer bias applied to the transfer roller 5.

The transfer unit 5 also serves as a pressurizing member, and can reliably bring the toner image into close contact with the recording sheet S while transferring the toner image from the photoreceptor 1 onto the recording sheet S.

After the toner image is transferred onto the recording sheet S, the blade 85 of the cleaner 8 removes the developer remaining on the surface of the photoreceptor 1.

In a process in which the recording sheet S onto which the toner image has been transferred is conveyed to the pressure bonding unit 9 by the conveyance belt 13, the light source 41 irradiates the toner image transferred onto the recording sheet S with light. By emitting light toward the toner image on the first surface of the recording sheet S from the light source 41, the toner image can be melted more reliably, and the fixability of the toner image onto the recording sheet S can be enhanced.

When the recording sheet S holding the toner image reaches the pressure bonding unit 9 by the conveyance belt 13, the pressurizing members 91 and 92 pressure-bond the toner image to the first surface of the recording sheet S. The toner image is softened by light irradiation from the light source 41 before the toner image is fixed by the pressure bonding unit 9. Therefore, energy required for pressure-bonding the image to the recording sheet S can be reduced. Furthermore, in the step of solidifying the toner image and fixing the toner image onto the recording medium, the toner image is pressurized by the pressurizing members 91 and 92, and the fixability of the toner image onto the recording sheet S is thereby further enhanced.

Pressure when the toner image is pressurized is as described above. Note that the pressurization step may be performed before, simultaneously with, or after the step of irradiating a toner image with light to soften the toner image. The pressurization step is preferably performed after light irradiation from a viewpoint of being able to pressurize the toner image in a softened state in advance and easily enhancing image intensity.

The pressurizing member 91 can heat a toner image on the recording sheet S when the recording sheet S passes between the pressurizing members 91 and 92. The toner image softened by light irradiation is further softened by this heating, and as a result, fixability of the toner image to the recording sheet S is further improved.

The heating temperature of the toner image is as described above. The heating temperature of the toner image (surface temperature of the toner image) can be measured with a non-contact temperature sensor. Specifically, for example, it is only required to dispose a non-contact temperature sensor at a position where the recording medium is discharged from the pressurizing member, and to measure the surface temperature of the toner image on the recording medium.

The toner image pressure-bonded by the pressurizing members 91 and 92 is solidified and fixed onto the recording sheet S.

In an embodiment of the present invention, a fixing device includes a pressure bonding unit including a pressurizing member.

In an embodiment of the present invention, the pressurizing member includes a heating means.

In an embodiment of the present invention, the temperature of the pressurizing member is preferably 15° C. or higher, more preferably 20° C. or higher, still more preferably higher than 20° C., further still more preferably 30° C. or higher, and further still more preferably 40° C. or higher. The upper limit is not particularly limited, but is, for example, 200° C. or lower, 150° C. or lower, or 100° C. or lower.

<Photoresponsive Adhesive and Optical Switching Material>

Since the polymer according to an embodiment of the present invention is fluidized by light irradiation and reversibly non-fluidized, a photoresponsive adhesive (photosensitive adhesive) and an optical switching material that can be repeatedly used can be prepared using the polymer according to an embodiment of the present invention. For example, the composition according to an embodiment of the present invention can be applied to various bonding techniques as a photoresponsive adhesive that can be repeatedly photoattached and photodetached in response to a change in viscosity (coefficient of friction). That is, an embodiment of the present invention is a photoresponsive adhesive or an optical switching material containing the polymer according to an embodiment of the present invention.

The photoresponsive adhesive according to an embodiment of the present invention can be used for temporary fixing that can be used repeatedly, and is also suitable for recycling, but is not limited thereto.

Examples

Hereinafter, the present invention will be specifically described with reference to Examples, but the present invention is not limited thereto.

<Synthesis of Azomethine Derivative Monomer>
(Synthesis of Azomethine Derivative Monomer 1)

Into a 100 ml four-neck flask, 2,6-dimethyl-4-hydroxybenzaldehyde (6.9 g, 0.046 mol), 4-amino-1-methylpyrazole (4.5 g, 0.046 mol), and 100 ml of ethanol were put, and the resulting mixture was heated and stirred. The reaction solution was subjected to suction filtration, and the obtained powder was washed with cooling ethanol. Furthermore, the resulting product was recrystallized with methanol/ethanol to obtain target product 1.

[Chemical formula 27]

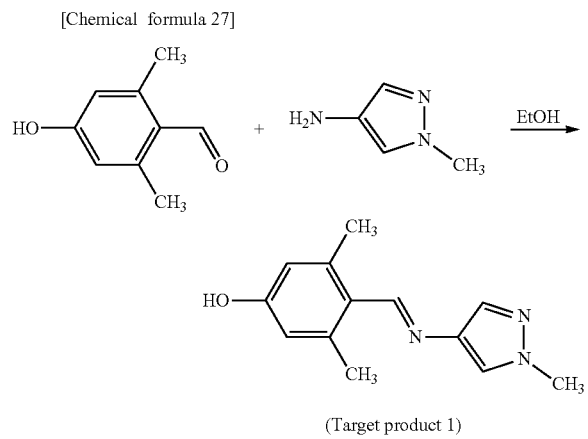

(Target product 1)

Subsequently, in a 200 ml four-neck flask, target product 1 (5 g, 0.022 mol) obtained above was dissolved in 25 ml of dimethylformamide (DMF). To the resulting solution, 4.88 g (0.035 mol) of potassium carbonate was added, and the resulting mixture was stirred while being maintained at 30° C. To this solution, 10.2 mg (0.06 mmol) of potassium iodide and 6-chloro-1-hexanol (3.5 g, 0.026 mol) were added and caused a reaction therebetween at 110° C. The resulting product was cooled to room temperature, added to 650 g of ice, and then filtered. The crystals were dispersed in 400 ml of water, and the resulting dispersion was stirred overnight, washed, filtered, and dried. Furthermore, the resulting product was recrystallized with ethanol to obtain target product 2.

[Chemical formula 28]

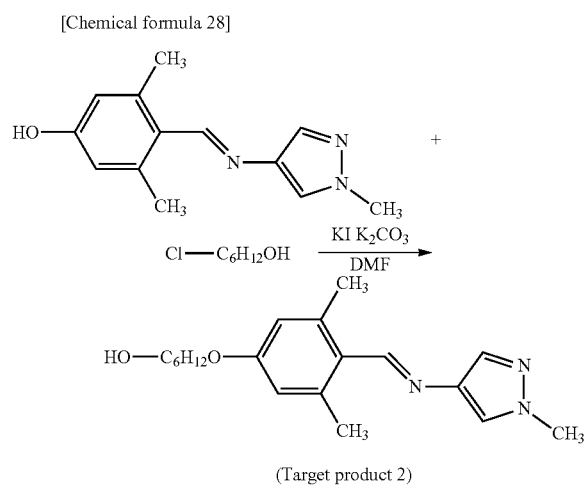

(Target product 2)

Next, into a 100 ml four-neck flask, target product 2 (3.30 g, 0.01 mol) obtained above, 1.34 ml (0.01 mol) of triethylamine, and 30 ml of tetrahydrofuran (THF) were put. At this time, the raw materials were in a dispersed state. A solution obtained by dissolving 1.0 g (0.011 mol) of acrylic acid chloride in 10 ml of THF while the internal temperature thereof was maintained at 0° C. was dropwise added while the internal temperature thereof was maintained at 0 to 5° C. As the dropwise addition advanced, the raw materials were dissolved.

After completion of the dropwise addition, the temperature of the reaction solution was returned to room temperature, and the reaction solution was stirred. After completion of the reaction, THF was concentrated and removed. The residue was dissolved in ethyl acetate, and washed with dilute hydrochloric acid, a sodium hydrogen carbonate aqueous solution, and a saturated salt solution. An organic layer was dried over magnesium sulfate and then concentrated. The obtained crystals were purified with a silica gel column (ethyl acetate/heptane=1/5) to obtain azomethine derivative monomer 1.

[Chemical formula 29]

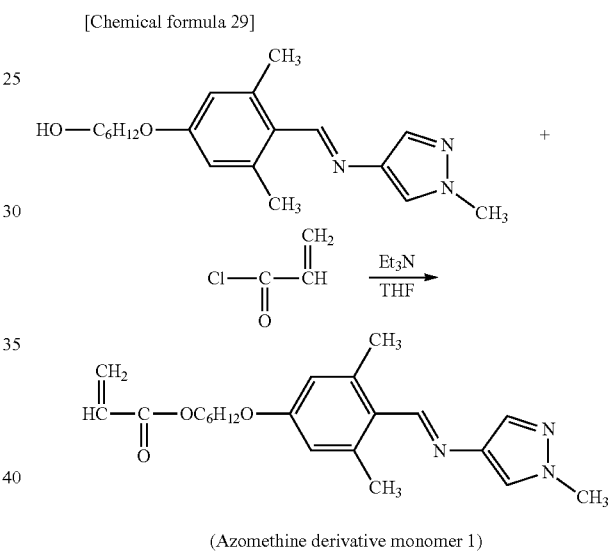

(Azomethine derivative monomer 1)

(Synthesis of Azomethine Derivative Monomers 2 to 15 and Comparative Monomers 1 to 8)

Azomethine derivative monomers 2 to 15 and comparative monomers 1 to 8 were synthesized by a similar method to the synthesis of azomethine derivative monomer 1 by changing the raw materials as described below, thus obtaining target products.

(Synthesis of Azomethine Derivative Monomer 2)
4-amino-1-methylpyrazole was changed to 4-amino-1-hexylpyrazole.

(Synthesis of Azomethine Derivative Monomer 3)
2,6-Dimethyl-4-hydroxybenzaldehyde was changed to 2,6-diethyl-4-hydroxybenzaldehyde.

(Synthesis of Azomethine Derivative Monomer 4)
2,6-Dimethyl-4-hydroxybenzaldehyde was changed to 2,6-dipropyl-4-hydroxybenzaldehyde.

(Synthesis of Azomethine Derivative Monomer 5)
2,6-Dimethyl-4-hydroxybenzaldehyde was changed to 2,6-dimethoxyl-4-hydroxybenzaldehyde.

(Synthesis of Azomethine Derivative Monomer 6)
2,6-Dimethyl-4-hydroxybenzaldehyde was changed to 2,6-fluoro-4-hydroxybenzaldehyde.

(Synthesis of Azomethine Derivative Monomer 7)
4-Amino-1-methylpyrazole was changed to 1-methyl-1H-pyrrol-3-amine, and 6-chloro-1-hexanol was changed to 10-chloro-1-decanol.

(Synthesis of Azomethine Derivative Monomer 8)
2,6-Dimethyl-4-hydroxybenzaldehyde was changed to 1-hexyl-1H-pyrrole-3-carboxaldehyde, and 4-amino-1-methylpyrazole was changed to 4-amino-3,5-dimethylphenol.

(Synthesis of Azomethine Derivative Monomer 9)
4-Amino-1-methylpyrazole was changed to 1-methyl-1H-pyrrol-2-amine.

(Synthesis of Azomethine Derivative Monomer 10)
4-Amino-1-methylpyrazole was changed to 6-aminoindole.

(Synthesis of Azomethine Derivative Monomer 11)
4-Amino-1-methylpyrazole was changed to 3-amino-1-methylpyrazole.

(Synthesis of Azomethine Derivative Monomer 12)
4-Amino-1-methylpyrazole was changed to 2-aminoimidazole, and 6-chloro-1-hexanol was changed to 10-chloro-1-decanol.

(Synthesis of Azomethine Derivative Monomer 13)
4-Amino-1-methylpyrazole was changed to 5-hexyl-2-thiophenamine, and 6-chloro-1-hexanol was changed to 10-chloro-1-decanol.

(Synthesis of Azomethine Derivative Monomer 14)
2,6-Dimethyl-4-hydroxybenzaldehyde was changed to 5-methylthiophene-2-carboxaldehyde, and 4-amino-1-methylpyrazole was changed to 4-amino-3,5-dimethylphenol.

(Synthesis of Azomethine Derivative Monomer 15)
The acrylic acid chloride was changed to a methacrylic acid chloride.

(Synthesis of Comparative Monomer 1)
2,6-Dimethyl-4-hydroxybenzaldehyde was changed to 2-methyl-4-hydroxybenzaldehyde, and 4-amino-1-methylpyrazole was changed to 4-amino-1-hexylpyrazole.

(Synthesis of Comparative Monomer 2)
2,6-Dimethyl-4-hydroxybenzaldehyde was changed to 2,5-dimethyl-4-hydroxybenzaldehyde.

(Synthesis of Comparative Monomer 3)
2,6-Dimethyl-4-hydroxybenzaldehyde was changed to 2-fluoro-4-hydroxybenzaldehyde, and 4-amino-1-methylpyrazole was changed to 4-amino-1-ethylpyrazole.

(Synthesis of Comparative Monomer 4)
2,6-Dimethyl-4-hydroxybenzaldehyde was changed to 1-hexyl-1H-pyrazole-4-carboxaldehyde, and 4-amino-1-methylpyrazole was changed to 4-amino-2,5-dimethylphenol.

(Synthesis of Comparative Monomer 5)
2,6-Dimethyl-4-hydroxybenzaldehyde was changed to 1-methyl-1H-pyrazole-4-carboxaldehyde, and 4-amino-1-methylpyrazole was changed to 4-amino-3-fluorophenol.

(Synthesis of Comparative Monomer 6)
2,6-Dimethyl-4-hydroxybenzaldehyde was changed to 1-methyl-1H-pyrazole-4-carboxaldehyde, and 4-amino-1-methylpyrazole was changed to 4-amino-3-methoxyphenol.

(Synthesis of Comparative Monomer 7)
2,6-Dimethyl-4-hydroxybenzaldehyde was changed to 1-hydroxylpyrazole-4-carboaldehyde, and 4-amino-1-methylpyrazole was changed to 4-hexyloxy-2,5-dimethylaniline.

(Synthesis of Comparative Monomer 8)
2,6-Dimethyl-4-hydroxybenzaldehyde was changed to 4-hydroxybenzaldehyde, and 4-amino-1-methylpyrazole was changed to 1-methyl-1H-pyrrol-3-amine.

(Synthesis of Azobenzene Derivative (Comparative 9))
The following comparative compound (number average molecular weight Mn: 2870) was obtained by a method described in paragraphs 0217 to 0227 of JP 2014-191078 A.

[Chemical formula 30]

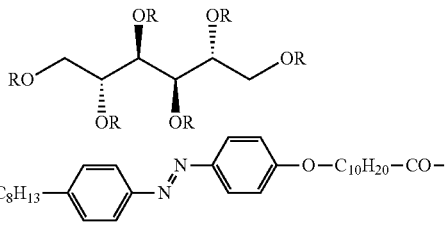

$R = C_8H_{13}$—

Table 1 below presents structures of the obtained azomethine derivative monomers 1 to 15 and comparative monomers 1 to 8. In Table 1, the structure of A refers to A in the structural unit described in the general formula (2).

[Synthesis of Polymer]
<Synthesis of Polymer 1>

In a 100 ml four-neck flask, 1.61 g (4.2 mmol) of azomethine derivative monomer 1 obtained above, 5 mg (0.023 mmol) of 4-cyanopentanoic acid dithiobenzoate, and 1 mg (0.006 mmol) of AIBN were dissolved in 4 ml of anisole. Then, freeze degassing was performed to obtain an argon gas atmosphere. Thereafter, the temperature was raised to 75° C., and the solution was stirred for eight hours to perform polymerization. To the obtained polymer solution, 40 ml of methanol was gradually dropwise added. Thereafter, THF was added thereto to remove unreacted azomethine derivative monomer 1. The separated polymer solution was dried in a vacuum drying furnace at 40° C. for 24 hours to obtain azomethine derivative-containing polymer 1. The number average molecular weight Mn of polymer 1 thus obtained was measured by the GPC method and found to be 13000.

Note that the molecular weight distribution was measured by GPC as follows.

That is, using an apparatus "HLC-8220" (manufactured by Tosoh Corporation) and a column "TSK guard column+ TSK gel Super HZM-M triplicate" (manufactured by Tosoh Corporation), tetrahydrofuran (THF) as a carrier solvent was allowed to flow at a flow rate of 0.2 mL/min while the column temperature was maintained at 40° C., and a measurement sample was dissolved in tetrahydrofuran so as to have a concentration of 1 mg/mL under a dissolution condition of performing treatment for five minutes using an ultrasonic disperser at room temperature (25° C.). Subsequently, the measurement sample was treated with a membrane filter having a pore size of 0.2 μm to obtain a sample solution, and 10 μL of this sample solution was injected into the apparatus together with the carrier solvent, and detected using a refractive index detector ($R_1$ detector). The molecular weight distribution of the measurement sample was calculated using a calibration curve measured using monodisperse polystyrene standard particles. As a standard polystyrene sample for measuring a calibration curve, 10 types of standard polystyrene samples having molecular weights of $6 \times 10^2$, $2.1 \times 10^3$, $4 \times 10^3$, $1.75 \times 10^4$, $5.1 \times 10^4$, $1.1 \times 10^5$, $3.9 \times 10^5$, $8.6 \times 10^5$, $2 \times 10^6$, and $4.48 \times 10^6$, respectively, and manufactured by Pressure Chemical Company were measured, and a calibration curve was created. A refractive index detector was used as a detector.

The number average molecular weight Mn was calculated from a chromatogram indicating a molecular weight distribution measured by GPC as described above.

<Synthesis of Polymers 2 to 16 and Comparative Polymers 1 to 8>

In the synthesis of polymer 1, azomethine derivative monomer 1 was changed to azomethine derivative monomers 2 to 15 and comparative polymers 1 to 8, and polymerization conditions were appropriately adjusted as necessary to synthesize polymers 2 to 15 and comparative polymers 1 to 8 presented in Table 2 below. Polymer 16 was prepared by appropriately changing the polymerization time in the synthesis of polymer 1.

<Synthesis of Polymer 17>

Polymer 17 was obtained in a similar manner to the synthesis of polymer 1 except that 1.01 g of the azomethine derivative monomer and 0.6 g of styrene were used instead of 1.61 g of azomethine derivative monomer 1.

<Synthesis of Polymers 18 to 20>

Polymers 18 to 20 were obtained by changing 0.6 g of styrene to 0.6 g of ethyl acrylate, 0.6 g of n-butyl methacrylate, and 0.3 g/0.3 g of styrene/methyl acrylate, respectively, in the synthesis of polymer 17.

<Synthesis of Polymer 21>

Synthesis of Macroinitiator 21

2,2'-Bipyridyl (230 mg, 1.47 mmol) was put into a 100 ml eggplant flask. Cu(I)Br (95 mg, 0.66 mmol), styrene (3.7 g, 36 mmol), and 2-ethyl bromoisobutyrate (35 mg, 0.18 mmol) were further added to the eggplant flask in a glove box under a nitrogen atmosphere, and the eggplant flask was sealed. The resulting mixture was heated and stirred in an oil bath at 100° C. Thereafter, an appropriate amount of tetrahydrofuran was added thereto, and the resulting mixture was caused to pass through a neutral alumina column. The resulting product was purified by reprecipitation and centrifugation with methanol to obtain macroinitiator 21. The number average molecular weight (p Mn) of macroinitiator 21 thus obtained was measured by the GPC method and found to be 6000.

Synthesis of Polymer 21

Azomethine derivative monomer 1 (4.1 g, 10.7 mmol) obtained above and the above macroinitiator 21 (1.08 g, 0.18 mmol) were put into a 100 ml eggplant flask. Cu(I)Cl (29 mg, 0.29 mmol), 1,1,4,7,10,10-hexamethyltriethylenetetramine (136 mg, 0.59 mmol), and anisole (4.9 g, 41.1 mmol) as a solvent were further added to the eggplant flask in a glove box under a nitrogen atmosphere, and the eggplant flask was sealed. Then, the resulting mixture was heated and stirred in an oil bath at 80° C. Thereafter, an appropriate amount of chloroform was added thereto, and the resulting mixture was caused to pass through a basic alumina column. The resulting product was purified by reprecipitation and centrifugation with methanol to obtain polymer 21. The total number average molecular weight Mn of polymer 21 thus obtained was measured by the GPC method and found to be 16000. From this value, the number average molecular weight (a Mn) of the structural unit derived from the azomethine derivative is determined to be 10000.

<Synthesis of Polymer 22>

Synthesis of Macroinitiator 22

Macroinitiator 22 was obtained in a similar manner to the synthesis of macroinitiator 21 except that ethyl 2-bromoisobutyrate was changed to α,α'-dibromo-p-xylene.

Synthesis of Polymer 22

Polymer 22 was obtained in a similar manner to the synthesis of polymer 21 except that macroinitiator 21 was changed to macroinitiator 22.

<Synthesis of Polymer 23>

Synthesis of Macroinitiator 23

Macroinitiator 23 was obtained by a similar method to the synthesis of macroinitiator 21 except that ethyl 2-bromoisobutyrate was changed to ethylene bis(2-bromoisobutyrate), 2,2'-bipyridyl was changed to 1,1,4,7,10,10-hexamethyltriethylenetetramine, styrene was changed to azomethine derivative monomer 1, and anisole was further added.

Synthesis of Polymer 23

Polymer 23 was obtained by a similar method to the synthesis of polymer 21 except that macroinitiator 21 was changed to macroinitiator 23, 1,1,4,7,10,10-hexamethyltriethylenetetramine was changed to 2,2'-bipyridyl, and azomethine derivative monomer 1 was changed to styrene.

<Synthesis of Polymer 24>

Macroinitiator 24 was obtained by a similar method to the synthesis of macroinitiator 21 except that ethyl 2-bromoisobutyrate was changed to 1,1,1-tris(2-bromoisobutyryloxymethyl) ethane. Polymer 24 was obtained by a similar method to the synthesis of polymer 21 except that macroinitiator 21 was changed to macroinitiator 24.

<Synthesis of Polymer 25>

Macroinitiator 25 was obtained by a similar method to the synthesis of macroinitiator 23 except that ethylene bis(2-bromoisobutyrate) was changed to 1,1,1-tris(2-bromoisobutyryloxymethyl) ethane. Polymer 25 was obtained by a similar method to the synthesis of polymer 23 except that macroinitiator 23 was changed to macroinitiator 32.

<Synthesis of Polymer 26>

Macroinitiator 26 was obtained by a similar method to the synthesis of macroinitiator 21 except that ethyl 2-bromoisobutyrate was changed to pentaerythritol tetrakis(2-bromoisobutyrate). Polymer 26 was obtained by a similar method to the synthesis of polymer 21 except that macroinitiator 21 was changed to macroinitiator 26.

<Synthesis of Polymer 27>

Macroinitiator 27 was obtained by a similar method to the synthesis of macroinitiator 23 except that ethylene bis(2-bromoisobutyrate) was changed to pentaerythritol tetrakis(2-bromoisobutyrate). Polymer 27 was obtained by a similar method to the synthesis of polymer 23 except that macroinitiator 23 was changed to macroinitiator 27.

<Synthesis of Polymer 28>

Macroinitiator 28 was obtained by a similar method to the synthesis of macroinitiator 22 except that styrene was changed to methyl acrylate. Polymer 28 was obtained by a similar method to the synthesis of polymer 22 except that macroinitiator 22 was changed to macroinitiator 28.

Table 2 presents a polymer structure of each of the obtained polymers, a monomer constituting each of the polymers, a number average molecular weight of each of the polymers, and a number average molecular weight of each polymer block constituting a block copolymer.

[Preparation of Toner]

<Preparation of Toner 1>

(Preparation of Polymer Particle Dispersion 1)

80 parts by mass of dichloromethane and 20 parts by mass of polymer 1 obtained above were mixed and stirred while being heated at 50° C. to obtain a solution containing polymer 1. To 100 parts by mass of the obtained solution, a mixed solution of 99.5 parts by mass of distilled water warmed to 50° C. and 0.5 parts by mass of a 20% by mass sodium dodecylbenzene sulfonate aqueous solution was added. Thereafter, the resulting mixture was stirred at 16000 rpm for 20 minutes with a homogenizer (manufactured by Heidolph Instruments) equipped with a shaft generator 18F and emulsified to obtain an emulsion of the polymer 1.

The obtained emulsion was put into a separable flask, and heated and stirred at 40° C. for 90 minutes while nitrogen was fed into a gas phase, and the organic solvent was removed to obtain a polymer particle dispersion 1. The particle size of a polymer particle in polymer particle dispersion 1 was measured using Microtrack UPA-150 (manufactured by Nikkiso Co., Ltd.) and found to be 175 nm in terms of a mass average particle size.

(Preparation of Black Colorant Particle Dispersion (Bk-1))

90 parts by mass of sodium dodecyl sulfate was added to 1600 parts by mass of deionized water. While this solution was stirred, 320 parts by mass of carbon black "Regal (registered trademark) 330R" (manufactured by Cabot Corporation) was gradually added to the solution, and subsequently the resulting solution was dispersed using a stirring device "CLEARMIX" (manufactured by M Technique Co., Ltd.) to prepare a black colorant particle dispersion (Bk-1). Colorant particles in black colorant particle dispersion (Bk-1) had a volume-based median diameter of 110 nm.

(Preparation of Toner 1)

Into a reaction container equipped with a stirrer, a temperature sensor, and a cooling tube, 480 parts by mass (in terms of solid content) of particle dispersion of polymer 1 and 2000 parts by mass of deionized water were put. Thereafter, a 5 mol/L sodium hydroxide aqueous solution was added thereto under stirring at 150 rpm, and the pH (in terms of a value at 25° C.) was adjusted to 10.

Thereafter, 24 parts by mass (in terms of solid content) of colorant particle dispersion (Cy1) was added thereto. Subsequently, an aqueous solution obtained by dissolving 60 parts by mass of magnesium chloride in 60 parts by mass of deionized water was added thereto under stirring at 150 rpm at 30° C. over 10 minutes. This system was left for three minutes, and then the temperature was raised to 70° C. over 60 minutes under stirring at 200 rpm. While the temperature was maintained at 70° C., a particle growth reaction was continued. In this state, the particle size of an associated particle was measured with "Coulter Multisizer 3" (manufactured by Beckman Coulter, Inc.). When the volume-based median diameter ($D_{50}$) reached 6.1 m, an aqueous solution obtained by dissolving 20 parts by mass of sodium chloride in 80 parts by mass of deionized water was added thereto to stop the particle growth. The resulting solution was stirred at 70° C. for one hour. Thereafter, the temperature was further raised. The solution was heated and stirred at 75° C. to promote fusion of the particles. Thereafter, the solution was cooled to 30° C. to obtain a dispersion of toner matrix particles.

Subsequently, operation of performing solid-liquid separation, re-dispersing the dehydrated toner cake in deionized water, and performing solid-liquid separation was repeated three times. The toner cake was washed and then dried at 40° C. for 24 hours to obtain toner matrix particles.

To the obtained toner matrix particles, 1.5% by mass of hydrophobic silica (number average primary particle size=12 nm) was added and mixed using a Henschel mixer (registered trademark) to obtain toner 1.

<Preparation of Toners 2 to 28 and Comparative Toners 1 to 9>

Toners 2 to 28 and comparative toners 1 to 8 were prepared in a similar manner to the preparation of toner 1 except that polymers 2 to 28 and comparative polymers 1 to 8 were used, respectively, instead of polymer 1. Comparative toner 9 was prepared by a similar procedure to the preparation of toner 1 except that polymer 1 was changed to an azobenzene derivative (comparative 9) as the comparative compound.

<Preparation of Toner 29>

(Preparation of Styrene Acrylic Resin Particle Dispersion)

Into a 5 L reaction container equipped with a stirrer, a temperature sensor, a cooling tube, and a nitrogen introducing device, 5.0 parts by mass of sodium lauryl sulfate and 2500 parts by mass of deionized water were put. While the resulting mixture was stirred at a stirring speed of 230 rpm under a nitrogen stream, the internal temperature was raised to 80° C.

Subsequently, an aqueous solution obtained by dissolving 15.0 parts by mass of potassium persulfate (KPS) in 300 parts by mass of deionized water was added thereto, and the liquid temperature was set to 80° C. again. Thereafter, a monomer mixed solution containing 840.0 parts by mass of styrene (St), 288.0 parts by mass of n-butyl acrylate (BA), 72.0 parts by mass of methacrylic acid (MAA), and 15 parts by mass of n-octylmercaptan was dropwise added thereto over two hours. After completion of the dropwise addition, polymerization was performed by heating and stirring the solution at 80° C. for two hours to prepare dispersion al of styrene acrylic resin A1 particles having a volume-based median diameter of 120 nm. The styrene acrylic resin A1 had a glass transition temperature (Tg) of 52.0° C. and a weight average molecular weight (Mw) of 28,000.

(Preparation of Toner 29)

Toner 29 was obtained in a similar manner to the preparation of toner 1 except that 480 parts by mass (in terms of solid content) of the particle dispersion of polymer 1 was changed to 336 parts by mass (in terms of solid content) of the particle dispersion of polymer 1 and 144 parts by mass (in terms of solid content) of dispersion al of styrene acrylic resin A1 particles.

<Preparation of Toner 30>

(Preparation of Amorphous Polyester Resin Dispersion)

Into a reaction container equipped with a stirrer, a thermometer, a capacitor, and a nitrogen gas introducing tube, a monomer having the following composition and 0.25 parts by mass of tin dioctylate with respect to 100 parts by mass of the total amount of the monomer having the following composition were put. The resulting mixture was reacted at 235° C. for six hours under a nitrogen gas stream. Thereafter, the temperature was lowered to 200° C., and reaction was caused for one hour. The temperature was raised to 220° C. over five hours, and polymerization was performed under a pressure of 10 kPa until a desired molecular weight was obtained, thus obtaining a pale yellow transparent amorphous polyester resin (B1). The amorphous polyester resin (B1) had a weight average molecular weight of 18000 and an acid value of 17.8 mgKOH/g.

2 mol Adduct of bisphenol A ethylene oxide 50.2 parts by mass 2 mol Adduct of bisphenol A propylene oxide 249.8 parts by mass Terephthalic acid 82.5 parts by mass Fumaric acid 32.0 parts by mass 72 parts by mass of the amorphous polyester resin (B1) was added to 72 parts by mass of methyl ethyl ketone, and the resulting mixture was stirred at 30° C. for 30 minutes to dissolve the amorphous polyester resin (B1) therein. To the oil phase liquid, 2.1 parts by mass of a 25% by mass sodium hydroxide aqueous solution was added, and the resulting mixture was put into a reaction container equipped with a stirrer. While the oil phase liquid was stirred, 252 parts by mass of deionized water at 30° C. was dropwise added over 70 minutes and mixed. The liquid in the container became cloudy during the dropwise addition. After the entire amount of deionized water was dropwise added, a uniformly emulsified emulsion was obtained.

The emulsion was heated to 60° C. and stirred under reduced pressure of 15 kPa (150 mbar) for three hours using a diaphragm type vacuum pump V-700 (manufactured by BUCHI) to remove methyl ethyl ketone by distillation, thus preparing an amorphous polyester resin particle dispersion (b1).

(Preparation of Toner 30)

Toner 30 was obtained in a similar manner to the preparation of toner 1 except that 480 parts by mass (in terms of solid content) of the particle dispersion of polymer 1 was changed to 336 parts by mass (in terms of solid content) of the particle dispersion of polymer 1 and 144 parts by mass (in terms of solid content) of dispersion b1 of amorphous polyester resin B1 particles.

(Preparation of Developer)

Ferrite carrier particles coated with a copolymer resin of cyclohexane methacrylate and methyl methacrylate (monomer mass ratio 1:1) and having a volume average particle size of 30 μm were mixed with toners 1 to 30 and comparative toners 1 to 9 prepared above such that toner particles had a concentration of 6% by mass to obtain developers 1 to 30 and comparative developers 1 to 9, respectively. Mixing was performed for 30 minutes using a V-type mixer.

[Evaluation: Photoresponsive Adhesion Test of Polymer]

Figure 3:
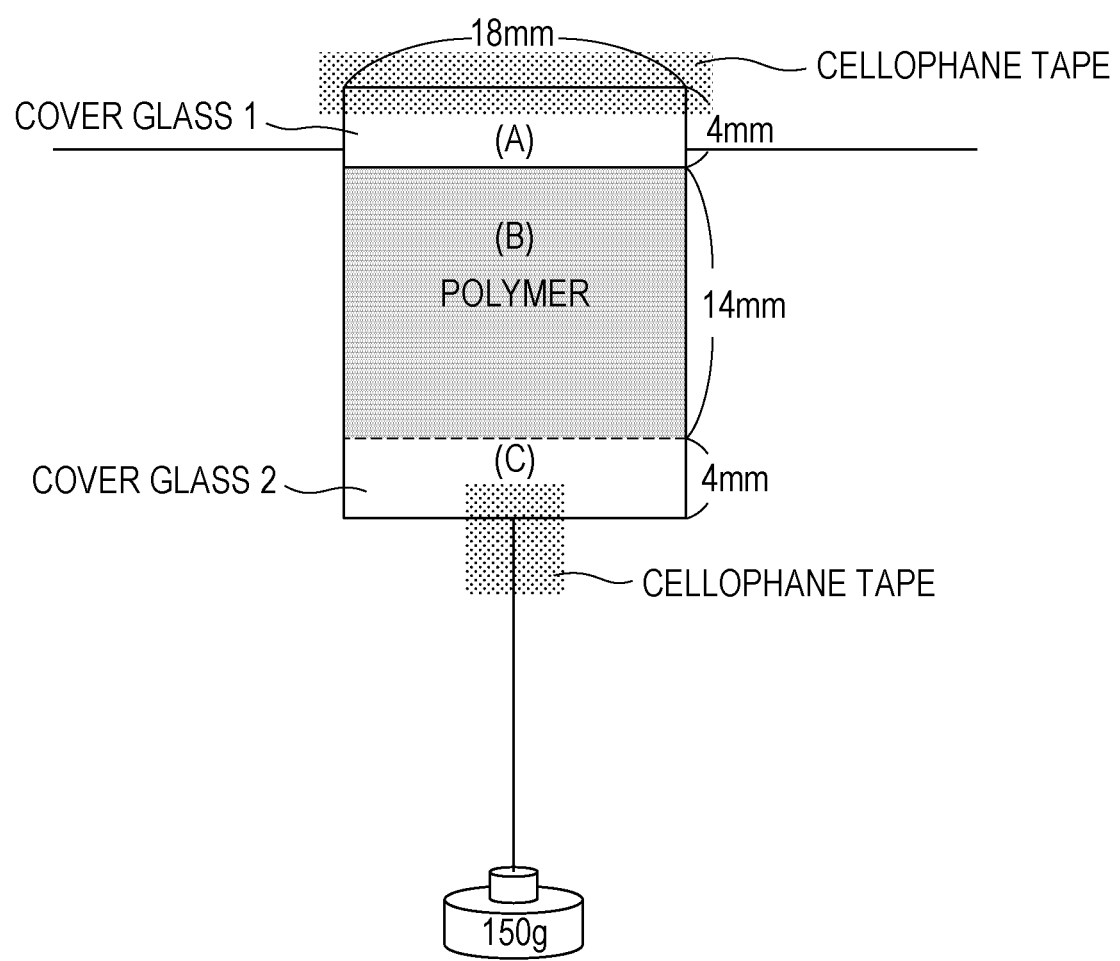
FIG. 3 is a schematic diagram of an apparatus for measuring a change in adhesiveness of a polymer used in a photoresponsive adhesion test in Examples due to light irradiation.

Polymers 1 to 28, comparative polymer 1 to 8, and the azomethine derivative (comparative 9) as a comparative compound, prepared above, were evaluated for a change in adhesiveness due to light irradiation by the following photoresponsive adhesion test using an apparatus illustrated in FIG. 3. As illustrated in FIG. 3, 4 mg of each of the polymers was placed on 18 mm square cover glass 1 within a radius of 6 mm from the center of the glass, and each of the polymers was entirely covered with cover glass 2 having the same size as the cover glass 1 at a position displaced by about 4 mm in a direction parallel to cover glass 1. The sample thus obtained was heated to melt the sample, and cover glass 1 and cover glass 2 were bonded to each other. Each of the obtained samples was subjected to the following non-fluidity→fluidity test, and then subjected to the following fluidity→non-fluidity (return) test.

<Non-Fluidity→Fluidity Test>

The portion (A) illustrated in FIG. 3 was fixed to a table with a cellophane tape, and a vinyl string having a length of 30 cm with a 150 g weigh was fixed to the portion (C) with a cellophane tape. The portion (B) was irradiated with light of 365 nm at an irradiation amount of 18 J/cm². It was confirmed whether cover glass 2 was peeled off from cover glass 1, and judgement was made according to the following evaluation criteria.

—Evaluation Criteria of Non-Fluidity→Fluidity Test—

⊙: Cover glass 2 has been completely peeled off from cover glass 1.

○: Cover glass 2 has been displaced from cover glass 1.

x: Cover glass 2 has not moved.

<Fluidity→Non-Fluidity (Return) Test>

After completion of the non-fluidity→fluidity test, the following experiment was performed on a sample in which cover glass 2 had been completely peeled off and a sample in which cover glass 2 had been displaced. Note that for the sample in which cover glass 2 had been displaced from cover glass 1, cover glass 2 was peeled off from cover glass 1 by hand. Ten minutes after end of light irradiation in the non-fluidity→fluidity test (the samples were left in a natural environment, that is, at room temperature in a dark room for ten minutes), cover glass 3 (having the same size as cover glasses 1 and 2) was placed so as to cover a sample portion (portion (B)) of cover glass 1 used in the test. It was confirmed whether cover glass 1 and cover glass 3 were bonded to each other, and judgment was made according to the following evaluation criteria.

—Evaluation Criteria of Fluidity→Non-Fluidity (Return) Test—

⊙: Not bonded (non-fluidized)

○: Partially bonded (partially kept in a fluidized state)

x: Bonded (kept in a fluidized state).

[Evaluation: Fixability Test]

A fixability test was performed in a normal temperature and humidity environment (temperature 20° C., relative humidity 50% RH) using developers 1 to 30 and comparative developers 1 to 9 obtained above. Each of the developers was disposed between a pair of parallel flat plate (aluminum) electrodes with the developer on one side and paper (Mondi color copy paper, basis weight: 120 g/m²) as a recording medium on the other side while being slid by a magnetic force. A toner was developed under a condition that a gap between the electrodes was 0.5 mm and the toner attachment amount in each of a DC bias and an AC bias was 5 g/m². A toner layer was formed on a surface of the paper and fixed with each fixing device to obtain a printed matter (image formation). A 1 cm square toner image of the printed matter was rubbed 15 times with "JK Wiper (registered trademark)" (manufactured by Nippon Paper Crecia Co., Ltd.) while a pressure of 50 kPa was applied thereto, and a fixing ratio of the image was evaluated. Results thereof are illustrated in Table 3 below. A fixing ratio of 75% or higher was regarded as being acceptable. Note that the fixing ratio of an image is a numerical value obtained by measuring a reflection density of the image after printing and the image after rubbing with a fluorescence spectrophotometer "FD-7" (manufactured by Konica Minolta Inc.), dividing the reflection density of the solid image after rubbing by the reflection density of the solid image after printing, and expressing the obtained value as a percentage.

As the fixing device, the following four types of fixing devices obtained by appropriately modifying the device illustrated in FIG. 2 were used:

No. 1: A fixing device not including the pressure bonding unit 9 illustrated in FIG. 2, in which the irradiation unit 40 emits ultraviolet light having a wavelength of 365 nm (light source: LED light source with an emission wavelength of 365 nm±10 nm) at an irradiation amount of 12 J/cm²

No. 2: A fixing device including the pressure bonding unit 9 in FIG. 2, in which the temperature of the pressurizing member 91 is 20° C., a pressure at the time of pressurization is 0.2 MPa, and the light source and the irradiation amount of the irradiation unit 40 are similar to those in No. 1;

No. 3: A fixing device including the pressure bonding unit 9 in FIG. 2, in which the temperature of the pressurizing member 91 is 50° C., a pressure at the time of pressurization is 0.2 MPa, and the light source and the irradiation amount of the irradiation unit 40 are similar to those in No. 1;

No. 4: A fixing device not including the pressure bonding unit 9 in FIG. 2, in which the temperature of the heating member 93 is 50° C., and the wavelength and the irradiation amount of the light source 41 are similar to those in No. 1.

—Evaluation Criteria of Fixability—
⊙: Fixing ratio is 85% or more
○: Fixing ratio is 75% or more and less than 85%
Δ: Fixing ratio is 60% or more and less than 75%
x: Fixing ratio is less than 60%.

[Document Offset Resistance]

In a normal temperature and humidity environment (temperature 20° C., relative humidity 50% RH), printed matters were created using developers 1 to 30 and comparative developers 1 to 9 obtained above. Each of the developers was disposed between a pair of parallel flat plate (aluminum) electrodes with the developer on one side and paper (CF paper, basis weight: 80 g/m²) as a recording medium on the other side while being slid by a magnetic force. A toner was developed under a condition that a gap between the electrodes was 0.5 mm and the toner attachment amount in each of a DC bias and an AC bias was 8 g/m². A toner layer was formed on a surface of the paper and fixed with the No. 1 fixing device to obtain 10 printed matters (image formation). The irradiation unit 40 emitted ultraviolet light having a wavelength of 365 nm (light source: LED light source with an emission wavelength of 365 nm±10 nm) at an irradiation amount of 12 J/cm².

Subsequently, the 10 printed matters thus output were arranged as they were on a marble table, and a weight was placed thereon such that a pressure of 19.6 kPa (200 g/cm²) was applied to a superposed portion. In this state, the printed matters were left in an environment of a temperature of 35° C. and a relative humidity of 50% RH for one day, and then the superposed printed matters were peeled off from each other. The degree of image defect on a toner image and the degree of offset to a non-image portion on a back side of paper were evaluated as document offset resistance according to the following criteria, and used as an index of image storability. Rank 4 or higher was regarded as being acceptable. Table 3 below illustrates evaluation results:

5: No image defect or image transition is observed in both an image portion and a non-image portion.
4: No image defect is observed in an image portion, but slight image transition is observed in a non-image portion on a back side of paper.
3: Almost no image defect is observed in an image portion, which is acceptable, but slight transition is observed in a non-image portion on a back side of paper.
2: Voids of image defect are generated in some portions of an image portion, and transition to a non-image portion on a back side of paper is observed in some portions.
1: A fixed image in an image portion is peeled off, severe image defect is observed, and clear image transition to a non-image portion on a back side of paper is observed.

[Color Reproducibility Evaluation]

For the images of Examples and Comparative Examples obtained in the above fixability test, color reproducibility was evaluated according to the following evaluation criteria by visual evaluation of 10 monitors. Specifically, as an evaluation comparison sample, a toner in which entire polymer 1 was changed to a styrene acrylic resin was prepared. Using this toner, a developer was prepared in a similar manner to the above, development was performed in a similar manner to the image formation in the above fixability test, and fixing was performed with the following fixing device No. 5.

Fixing device No. 5: A fixing device including the pressure bonding unit 9 in FIG. 2, in which the temperature of the pressurizing member 91 is 150° C., a pressure at the time of pressurization is 0.2 MPa, and light irradiation is not performed.

The 10 monitors were illustrated the evaluation comparison sample and each of the images obtained in Examples and Comparative Examples in order, and were asked whether the colors of the two images were clearly different. Judgment results based on the following color reproducibility evaluation criteria are illustrated in Table 3 below.

—Evaluation Criteria for Color Reproducibility—
⊙: Two or less monitors answered that they were clearly different.
○: Three or four monitors answered that they were clearly different.
Δ: Five to seven monitors answered that they were clearly different.
x: Eight or more monitors answered that they were clearly different.

TABLE 1

| Monomer No. | $r_1$ | A |
|---|---|---|
| 1 | H | 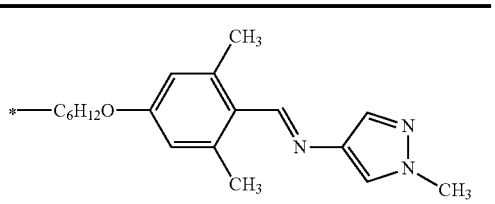 |
| 2 | H | 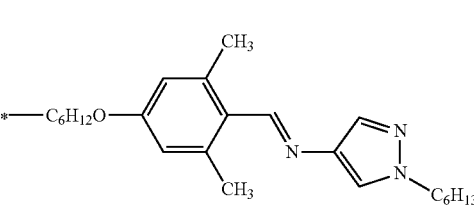 |

TABLE 1-continued
| Monomer No. | $r_1$ | A |
|---|---|---|
| 3 | H | 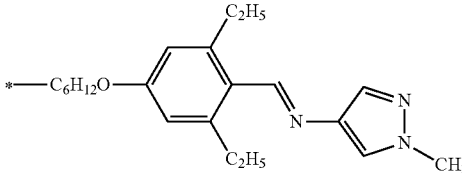 |
| 4 | H | 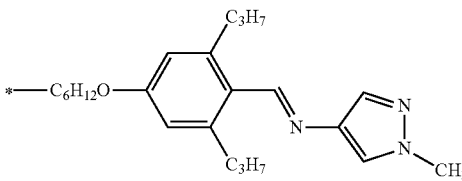 |
| 5 | H | 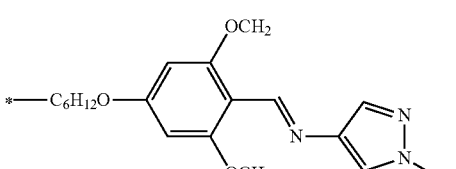 |
| 6 | H | 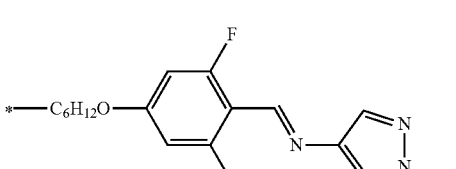 |
| 7 | H | 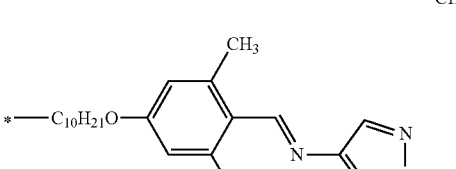 |
| 8 | H | 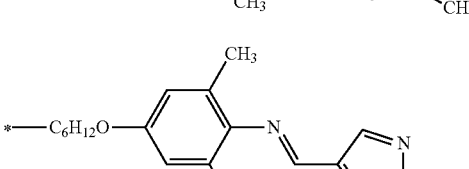 |
| 9 | H | 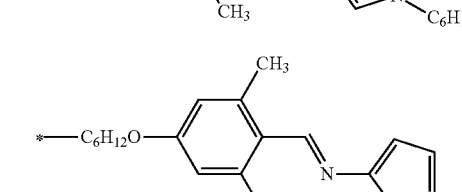 |
| 10 | H | 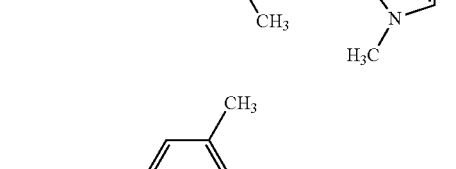 |

TABLE 1-continued
| Monomer No. | $r_1$ | A |
|---|---|---|
| 11 | H | 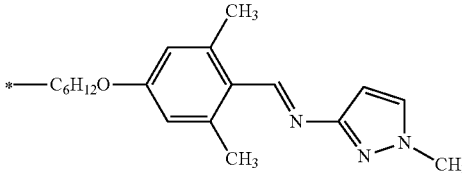 |
| 12 | H | 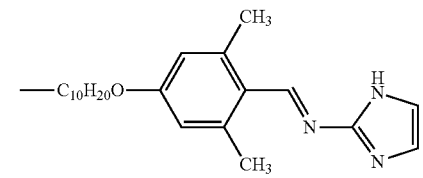 |
| 13 | H | 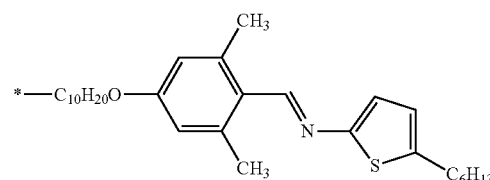 |
| 14 | H | 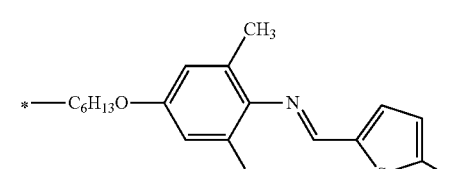 |
| 15 | $CH_3$ | 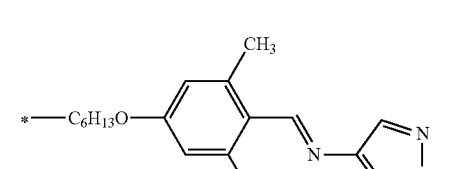 |
TABLE 1-2
| Monomer No. | $r_1$ | A |
|---|---|---|
| Comparative 1 | H | 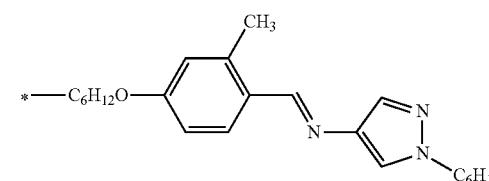 |
| Comparative 2 | H | 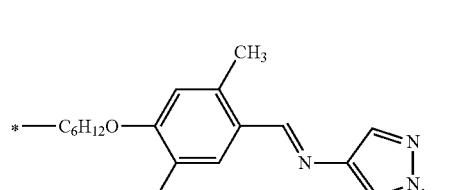 |

TABLE 1-2-continued

| Monomer No. | r₁ | A |
|---|---|---|
| Comparative 3 | H | 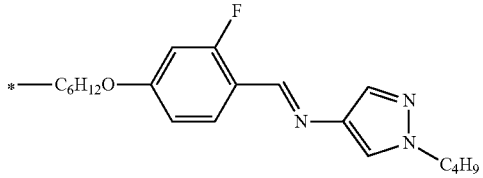 |
| Comparative 4 | H | 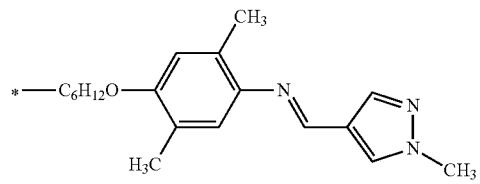 |
| Comparative 5 | H | 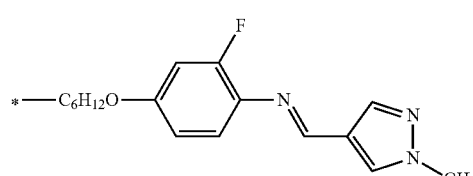 |
| Comparative 6 | H | 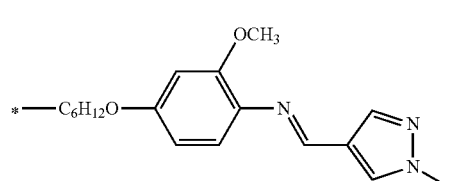 |
| Comparative 7 | H | 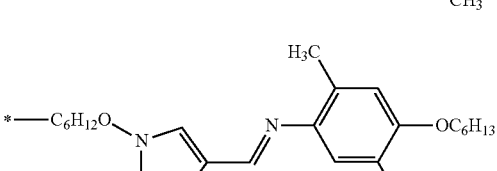 |
| Comparative 8 | H | 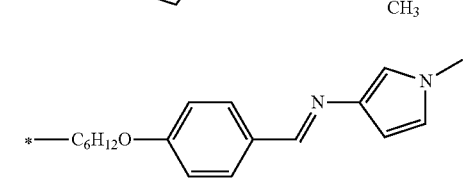 |
| Comparative 9 | H | Azobenzene derivative |

TABLE 2

| Polymer No. | Polymer structure | Structural unit α of general formula (1) Monomer No. | Structural unit α of general formula (1) α Mn | Other structural unit β Structural unit | Other structural unit β β Mn | Mn | Photoresponsive adhesion test Fluidized | Photoresponsive adhesion test Non-fluidized |
|---|---|---|---|---|---|---|---|---|
| 1 | Homopolymer | 1 | — | — | — | 13000 | ⊙ | ⊙ |
| 2 | Homopolymer | 2 | — | — | — | 1800 | ⊙ | ⊙ |
| 3 | Homopolymer | 3 | — | — | — | 7800 | ⊙ | ⊙ |
| 4 | Homopolymer | 4 | — | — | — | 5100 | ⊙ | ⊙ |
| 5 | Homopolymer | 5 | — | — | — | 12000 | ⊙ | ⊙ |
| 6 | Homopolymer | 6 | — | — | — | 9000 | ⊙ | ⊙ |
| 7 | Homopolymer | 7 | — | — | — | 14000 | ⊙ | ⊙ |

TABLE 2-continued

| Polymer No. | Polymer structure | Structural unit α of general formula (1) Monomer No. | α Mn | Other structural unit β Structural unit | β Mn | Mn | Photoresponsive adhesion test Fluidized | Non-fluidized |
|---|---|---|---|---|---|---|---|---|
| 8 | Homopolymer | 8 | — | — | — | 8200 | ☉ | ☉ |
| 9 | Homopolymer | 9 | — | — | — | 9500 | ☉ | ☉ |
| 10 | Homopolymer | 10 | — | — | — | 11000 | ☉ | ☉ |
| 11 | Homopolymer | 11 | — | — | — | 7200 | ☉ | ☉ |
| 12 | Homopolymer | 12 | — | — | — | 8800 | ☉ | ☉ |
| 13 | Homopolymer | 13 | — | — | — | 6500 | ☉ | ☉ |
| 14 | Homopolymer | 14 | — | — | — | 10000 | ☉ | ☉ |
| 15 | Homopolymer | 15 | — | — | — | 8100 | ☉ | ☉ |
| 16 | Homopolymer | 1 | — | — | — | 3000 | ☉ | ☉ |
| 17 | Random copolymer | 1 | — | St | — | 8000 | ☉ | ☉ |
| 18 | Random copolymer | 1 | — | EA | — | 7500 | ☉ | ☉ |
| 19 | Random copolymer | 1 | — | nBMA | — | 9200 | ☉ | ☉ |
| 20 | Random copolymer | 1 | — | St/MA | — | 8600 | ☉ | ☉ |
| 21 | Block copolymer α-β | 1 | 10000 | St | 6000 | 16000 | ☉ | ☉ |
| 22 | Block copolymer 2α-β | 1 | 12000 | St | 6000 | 18000 | ☉ | ☉ |
| 23 | Block copolymer α-2β | 1 | 7000 | St | 5000 | 12000 | ☉ | ☉ |
| 24 | Block copolymer 3α-β | 1 | 4800 | St | 7000 | 11800 | ☉ | ☉ |
| 25 | Block copolymer α-3β | 1 | 6600 | St | 9000 | 15600 | ☉ | ☉ |
| 26 | Block copolymer 4α-β | 1 | 1000 | St | 2400 | 3400 | ☉ | ☉ |
| 27 | Block copolymer α-4β | 1 | 12000 | St | 10000 | 22000 | ☉ | ☉ |
| 28 | Block copolymer 2α-β | 1 | 12000 | MA | 7500 | 19500 | ☉ | ☉ |
| Comparative 1 | Homopolymer | Comparative 1 | — | — | — | 23000 | ○ | ☉ |
| Comparative 2 | Homopolymer | Comparative 2 | — | — | — | 13000 | ○ | ☉ |
| Comparative 3 | Homopolymer | Comparative 3 | — | — | — | 18000 | ○ | ☉ |
| Comparative 4 | Homopolymer | Comparative 4 | — | — | — | 3500 | ○ | ☉ |
| Comparative 5 | Homopolymer | Comparative 5 | — | — | — | 15000 | ○ | ☉ |
| Comparative 6 | Homopolymer | Comparative 6 | — | — | — | 6800 | ○ | ☉ |
| Comparative 7 | Homopolymer | Comparative 7 | — | — | — | 7800 | ○ | ☉ |
| Comparative 8 | Homopolymer | Comparative 8 | — | — | — | 15000 | X | — |
| Comparative 9 | | Azobenzene derivative | | | | | ☉ | X |

St: Styrene
EA: Ethyl acrylate
nBMA: n-Butyl methacrylate
MA: Methyl acrylate

TABLE 3

| Example No. | Toner No. | Polymer No. | Polymer Ratio (% by mass) | Binder resin (Ratio (% by mass)) | Fixing device No. | Fixing ratio (%)/Rank | Document offset resistance | Color reproducibility |
|---|---|---|---|---|---|---|---|---|
| Example 1 | 1 | 1 | 100 | — | 1 | 90 ☉ | 5 | ☉ |
| Example 2 | 2 | 2 | 100 | — | 1 | 93 ☉ | 5 | ☉ |
| Example 3 | 3 | 3 | 100 | — | 1 | 91 ☉ | 5 | ☉ |
| Example 4 | 4 | 4 | 100 | — | 1 | 91 ☉ | 5 | ☉ |
| Example 5 | 5 | 5 | 100 | — | 1 | 90 ☉ | 5 | ☉ |
| Example 6 | 6 | 6 | 100 | — | 1 | 79 ○ | 4 | ☉ |
| Example 7 | 7 | 7 | 100 | — | 1 | 90 ☉ | 5 | ☉ |
| Example 8 | 8 | 8 | 100 | — | 1 | 84 ○ | 4 | ☉ |
| Example 9 | 9 | 9 | 100 | — | 1 | 85 ☉ | 5 | ☉ |
| Example 10 | 10 | 10 | 100 | — | 1 | 86 ☉ | 5 | ☉ |
| Example 11 | 11 | 11 | 100 | — | 1 | 85 ☉ | 5 | ☉ |
| Example 12 | 12 | 12 | 100 | — | 1 | 85 ☉ | 5 | ☉ |
| Example 13 | 13 | 13 | 100 | — | 1 | 86 ☉ | 5 | ☉ |
| Example 14 | 14 | 14 | 100 | — | 1 | 83 ○ | 4 | ☉ |
| Example 15 | 15 | 15 | 100 | — | 1 | 87 ☉ | 5 | ☉ |
| Example 16 | 16 | 16 | 100 | — | 1 | 91 ☉ | 5 | ☉ |
| Example 17 | 17 | 17 | 100 | — | 1 | 85 ☉ | 5 | ☉ |
| Example 18 | 18 | 18 | 100 | — | 1 | 89 ☉ | 5 | ☉ |
| Example 19 | 19 | 19 | 100 | — | 1 | 87 ☉ | 5 | ☉ |
| Example 20 | 20 | 20 | 100 | — | 1 | 86 ☉ | 5 | ☉ |
| Example 21 | 21 | 21 | 100 | — | 1 | 88 ☉ | 5 | ☉ |
| Example 22 | 22 | 22 | 100 | — | 1 | 90 ☉ | 5 | ☉ |
| Example 23 | 23 | 23 | 100 | — | 1 | 87 ☉ | 5 | ☉ |
| Example 24 | 24 | 24 | 100 | — | 1 | 86 ☉ | 5 | ☉ |
| Example 25 | 25 | 25 | 100 | — | 1 | 85 ☉ | 5 | ☉ |
| Example 26 | 26 | 26 | 100 | — | 1 | 87 ☉ | 5 | ☉ |

TABLE 3-continued

| Example No. | Toner No. | Polymer Polymer No. | Polymer Ratio (% by mass) | Binder resin (Ratio (% by mass)) | Fixing device No. | Fixing ratio (%)/Rank | Document offset resistance | Color reproducibility |
|---|---|---|---|---|---|---|---|---|
| Example 27 | 27 | 27 | 100 | — | 1 | 88 ☉ | 5 | ☉ |
| Example 28 | 28 | 28 | 100 | — | 1 | 92 ☉ | 5 | ☉ |
| Example 29 | 29 | 1 | 70 | Styrene acrylic resin (30) | 1 | 81 ○ | 4 | ☉ |
| Example 30 | 30 | 1 | 70 | Polyester resin (30) | 1 | 83 ○ | 4 | ☉ |
| Example 31 | 1 | 1 | 100 | — | 2 | 93 ☉ | 5 | ☉ |
| Example 32 | 1 | 1 | 100 | — | 3 | 95 ☉ | 5 | ☉ |
| Example 33 | 1 | 1 | 100 | — | 4 | 95 ☉ | 5 | ☉ |
| Comparative Example 1 | Comparative 1 | Comparative 1 | 100 | — | 1 | 72 Δ | 3 | ☉ |
| Comparative Example 2 | Comparative 2 | Comparative 2 | 100 | — | 1 | 70 Δ | 3 | ☉ |
| Comparative Example 3 | Comparative 3 | Comparative 3 | 100 | — | 1 | 65 Δ | 3 | ☉ |
| Comparative Example 4 | Comparative 4 | Comparative 4 | 100 | — | 1 | 74 Δ | 3 | ☉ |
| Comparative Example 5 | Comparative 5 | Comparative 5 | 100 | — | 1 | 61 Δ | 3 | ☉ |
| Comparative Example 6 | Comparative 6 | Comparative 6 | 100 | — | 1 | 73 Δ | 3 | ☉ |
| Comparative Example 7 | Comparative 7 | Comparative 7 | 100 | — | 1 | 68 Δ | 3 | ☉ |
| Comparative Example 8 | Comparative 8 | Comparative 8 | 100 | — | 1 | 52 X | 2 | ☉ |
| Comparative Example 9 | Comparative 9 | Azobenzene derivative | | | 1 | 39 X | 1 | X |

As is apparent from Table 2 above, it was confirmed that the polymer of each of Examples containing the specific structural unit represented by the general formula (1) was fluidized by light irradiation and reversibly non-fluidized. In the polymer of each of Comparative Examples 1 to 8 not having the above specific structural unit, fluidization by light irradiation is less likely to occur than the polymer of each of Examples. In the azobenzene derivative of Comparative Example 9, reversible non-fluidization after fluidization was not confirmed.

In addition, as illustrated in Table 3 above, all the toners using the polymers prepared in Examples were able to be fixed by light irradiation, and exhibited high fixability, high image stability, and excellent color reproducibility. On the other hand, the toners using the polymers prepared in Comparative Examples 1 to 8 had insufficient fixability and image stability. In addition, it was found that the toner using the azobenzene derivative of Comparative Example 9 had low fixability and image stability, and low color reproducibility.

Although embodiments of the present invention have been described and illustrated in detail, the disclosed embodiments are made for purposes of illustration and example only and not limitation. The scope of the present invention should be interpreted by terms of the appended claims.

What is claimed is:

1. A photoresponsive polymer comprising a structural unit represented by the following general formula (2), fluidized by light irradiation, and reversibly non-fluidized:

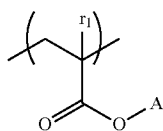

General formula (2)

wherein,
$r_1$ represents a hydrogen atom or a methyl group, and
A is represented by any one of the following general formulas (1-1) to (1-4):

\*—$R_1$—$Z_1$=$Z_2$—$R_2$      General formula (1-1)

\*-G-$R_1$—$Z_1$=$Z_2$—$R_2$      General formula (1-2)

\*—$R_2$—$Z_2$=$Z_1$—$R_1$      General formula (1-3)

\*-G-$R_2$—$Z_2$=$Z_1$—$R_1$      General formula (1-4)

in which
\* represents a bonding point, G represents a divalent group, and $Z_1$ and $Z_2$ each represent CH or N,
$Z_1 \neq Z_2$,
$R_1$ represents an aromatic hydrocarbon group having a substituent $R_a$ selected from the group consisting of an alkyl group having 1 to 5 carbon atoms, an alkoxy group having 1 to 5 carbon atoms, and a fluorine atom, at each of two ortho positions with respect to $Z_1$, and
$R_2$ represents a 5-member aromatic heterocyclic ring or a fused indole ring, with or without a substituent that is an alkyl group having 1 to 12 carbon atoms.

2. The polymer according to claim 1, wherein the $R_a$ represents an alkyl group having 1 to 3 carbon atoms, a methoxy group, or the fluorine atom.

3. The polymer according to claim 1, wherein the G represents an alkylene group having 1 to 18 carbon atoms or an oxyalkylene group having 1 to 18 carbon atoms.

4. The polymer according to claim 1, wherein the $R_2$ has at least one carbon atom constituting a ring structure of the aromatic heterocyclic group or the fused indole ring, bonded adjacent to a carbon atom bonded to a carbon atom or a nitrogen atom of the $Z_2$, and bonded to a hydrogen atom.

5. The polymer according to claim 1, wherein
the A is represented by the general formula (1-1) or (1-2), and the $R_2$ is represented by the following formula:

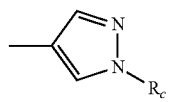

in the formula, $R_c$ represents the alkyl group having 1 to 12 carbon atoms.

6. The polymer according to claim 1, having a number average molecular weight Mn of 3000 or more.

7. The polymer according to claim 1, further comprising another structural unit derived from a monomer having a vinyl-based polymerizable group.

8. The polymer according to claim 7, wherein the monomer having a vinyl-based polymerizable group is at least one selected from the group consisting of a styrene derivative, a (meth)acrylic acid derivative, and an olefin derivative.

9. The polymer according to claim 1, represented by the following general formula (3):

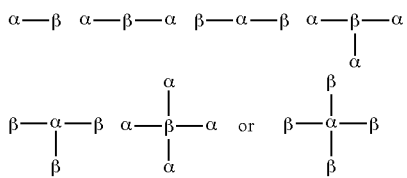

General formula (3)

wherein

αs each independently represent a polymer block containing a structural unit represented by the general formula (2), and βs each independently represent a polymer block containing a structural unit other than the structural unit represented by the general formula (2).

10. The polymer according to claim 9, wherein the α has a number average molecular weight of 1000 or more, the β has a number average molecular weight of 1000 or more, and a total number average molecular weight is 3000 or more.

11. The polymer according to claim 9, wherein the β is a polymer block containing at least one structural unit selected from the group consisting of a styrene derivative, a (meth)acrylic acid derivative, and an olefin derivative.

12. The polymer according to claim 1, wherein light in the light irradiation has a wavelength of 280 nm or more and 480 nm or less.

13. A toner comprising the photoresponsive polymer according to claim 1 as a binder resin.

14. The toner according to claim 13, further comprising another binder resin.

15. The toner according to claim 14, wherein the other binder resin contains at least one selected from the group consisting of a styrene acrylic resin and a polyester resin.

16. An image forming method comprising:

forming a toner image formed of the toner according to claim 13 on a recording medium; and irradiating the toner image with light to soften the toner image.

17. The image forming method according to claim 16, wherein the light has a wavelength of 280 nm or more and 480 nm or less.

18. The image forming method according to claim 16, further comprising pressurizing the toner image.

19. The image forming method according to claim 18, further comprising heating the toner image in pressurizing the toner image.

20. The image forming method according to claim 16, wherein the toner image is heated under light irradiation in irradiating the toner image with light to soften the toner image.

21. A photoresponsive adhesive comprising the photoresponsive polymer according to claim 1.

22. An optical switching material comprising the photoresponsive polymer according to claim 1.

* * * * *